United States Patent
Park et al.

(10) Patent No.: US 12,475,061 B2
(45) Date of Patent: Nov. 18, 2025

(54) SYSTEM-ON-CHIP CAPABLE OF CHANGING SIGNATURE VERIFICATION ALGORITHM AND OPERATING METHOD OF SYSTEM-ON-CHIP

(71) Applicant: SAMSUNG ELECTRONICS CO., LTD., Suwon-si (KR)

(72) Inventors: Keunyoung Park, Suwon-si (KR); Dongjin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 102 days.

(21) Appl. No.: 18/420,212

(22) Filed: Jan. 23, 2024

(65) Prior Publication Data

US 2024/0419608 A1    Dec. 19, 2024

(30) Foreign Application Priority Data

Jun. 14, 2023 (KR) .......................... 10-2023-0076031

(51) Int. Cl.
   G06F 21/00    (2013.01)
   G06F 12/14    (2006.01)
   H04L 9/32     (2006.01)

(52) U.S. Cl.
   CPC ........ *G06F 12/1408* (2013.01); *H04L 9/3247* (2013.01); *G06F 2212/1052* (2013.01)

(58) Field of Classification Search
   CPC ......... G06F 12/1408; G06F 2212/1052; G06F 21/64; G06F 21/575; G06F 21/76; H04L 9/3247; H04L 9/3228
   See application file for complete search history.

(56) References Cited

U.S. PATENT DOCUMENTS 9,716,708 B2   7/2017   Love et al.
9,880,856 B2   1/2018   Akdemir et al.
(Continued)

FOREIGN PATENT DOCUMENTS

CN    108347332 A    7/2018

OTHER PUBLICATIONS

F.-J. Streit et al., "Secure Boot from Non-Volatile Memory for Programmable SoC Architectures," 2020 IEEE International Symposium on Hardware Oriented Security and Trust (HOST), San Jose, CA, USA, 2020, pp. 102-110, doi: 10.1109/HOST45689.2020.9300126. (Year: 2020).*

(Continued)

*Primary Examiner* — Ka Shan Choy
(74) *Attorney, Agent, or Firm* — Sughrue Mion, PLLC

(57) ABSTRACT

A system-on-chip includes a nonvolatile memory configured to load a first image received from external storage and a first signature verification algorithm; at least one processor configured to control the nonvolatile memory such that first verifications are performed on the first image; a volatile memory; and a one-time programmable (OTP) memory configured to program a programmed hash value of a second signature verification algorithm different from the first signature verification algorithm. The at least one processor further is configured to: load a second image received from the external storage to the volatile memory, the second image being different from the first image; perform a second verification on the second image based on the programmed hash value; based on the second verification succeeding, execute the second signature verification algorithm corresponding to the version information; and perform the first verifications by applying the second signature verification algorithm to the first image.

20 Claims, 15 Drawing Sheets

(56) References Cited

U.S. PATENT DOCUMENTS

| | | |
|---|---|---|
| 11,216,597 B2 | 1/2022 | Alon et al. |
| 2007/0174680 A1 | 7/2007 | Su et al. |
| 2013/0268746 A1* | 10/2013 | Hsu .................... G06F 11/1417 |
| | | 713/2 |
| 2014/0250290 A1 | 9/2014 | Stahl et al. |
| 2017/0090909 A1 | 3/2017 | Guo et al. |
| 2017/0308705 A1* | 10/2017 | Karaginides ............ G06F 8/654 |
| 2018/0129809 A1* | 5/2018 | Zhang .................. H04L 9/3247 |
| 2022/0198018 A1* | 6/2022 | Wentz .................. H04L 9/3268 |
| 2022/0292203 A1 | 9/2022 | Severns-Williams et al. |
| 2024/0364536 A1* | 10/2024 | Wittenauer ........... H04L 9/0894 |

OTHER PUBLICATIONS

Elliptic Curve Digital Signature Algorithm, Wikipedia, The Free Encyclopedia, 7 Pages Total (Retrieved from "https://en.wikipedia.org/w/index.php?title=Elliptic_Curve_Digital_Signature_Algorithm&oldid=1181943550").

* cited by examiner

FIG. 10

| ALGADT | | | NDSA Type |
|---|---|---|---|
| ALG Version(OTP Memory) | Pointer(DSA address) | | |
| Version 0 | p0(ADDR 0) | | NDSA 0 |
| Version 1 | p1(ADDR 1) | | NDSA 1 |
| Version 2 | p2(ADDR 2) | | NDSA 2 |
| ... | ... | | ... |

SYSTEM-ON-CHIP CAPABLE OF CHANGING SIGNATURE VERIFICATION ALGORITHM AND OPERATING METHOD OF SYSTEM-ON-CHIP

CROSS-REFERENCE TO RELATED APPLICATIONS

This application is based on and claims priority under 35 U.S.C. § 119 to Korean Patent Application No. 10-2023-0076031 filed on Jun. 14, 2023, in the Korean Intellectual Property Office, the disclosure of which is incorporated by reference herein in its entirety.

BACKGROUND

Embodiments of the present disclosure described herein relate to an electronic device, and more particularly, to a system-on-chip capable of changing a signature verification algorithm for secure booting and an operating method thereof.

Electronic devices that are used in daily life include storage devices. The storage devices may store secure data such as personal information or work information of a user. Also, the storage devices may store booting data including an operating system code for driving an electronic device. The data stored in the storage devices may be driven by a system-on-chip (SoC) in which a plurality of devices are mounted in a single chip.

The system-on-chip (SoC) uses various security measures such as a secure boot, as a way to authenticate the data stored in the storage devices. The safety of the security measures may be verified in advance and may be mounted in the system-on-chip (SoC).

However, after the system-on-chip (SoC) is produced and released, a problem such as a secure hole may occur in the security measures mounted in the system-on-chip (SoC). The secure hole refers to a security defect caused by software design errors and program defects. This may make it difficult for the system-on-chip (SoC) to authenticate data based on existing security measures.

Accordingly, after the system-on-chip (SoC) is released, a method of permanently changing the security measures while maintaining the performance of secure booting may be required. In addition, after the system-on-chip (SoC) is released, a method capable of verifying the safety of the changed security measures may be required.

SUMMARY

Embodiments of the present disclosure provide a system-on-chip capable of improving the performance of secure booting by safely and permanently changing a signature verification algorithm for secure booting and an operating method thereof.

According to an aspect of an embodiment, a system-on-chip includes: a nonvolatile memory configured to load a first image received from external storage and a first signature verification algorithm; at least one processor configured to control the nonvolatile memory such that first verifications are performed on the first image; a volatile memory, wherein the first image is loaded to the volatile memory by the at least one processor; and a one-time programmable (OTP) memory configured to program a programmed hash value of a second signature verification algorithm different from the first signature verification algorithm. In initialization, based on version information about the second signature verification algorithm being further programmed in the OTP memory, the at least one processor is further configured to: load a second image received from the external storage to the volatile memory, the second image being different from the first image; perform a second verification on the second image based on the programmed hash value; based on the second verification succeeding, execute the second signature verification algorithm corresponding to the version information; and perform the first verifications by applying the second signature verification algorithm to the first image.

According to an aspect of an embodiment, an operating method of a system-on-chip which includes a nonvolatile memory storing a first signature verification algorithm, a volatile memory, and a one-time programmable (OTP) memory, and at least one processor configured to control the nonvolatile memory, the volatile memory, and the OTP memory, the operating method comprising: reading, by the at least one processor, the OTP memory; based on version information about a second signature verification algorithm different from the first signature verification algorithm being programmed in the OTP memory, loading, by the at least one processor, an encrypted first image received from external storage to the volatile memory; decrypting, by the at least one processor, the encrypted first image to obtain a decrypted first image; performing, by the at least one processor, a first verification on the decrypted first image based on a programmed hash value of the second signature verification algorithm programmed in the OTP memory; based on the first verification succeeding, executing, by the at least one processor, the second signature verification algorithm corresponding to the version information; loading, by the at least one processor, a second image received from the external storage to the volatile memory, the second image being different from the encrypted first image; and performing, by the at least one processor, second verifications by applying the second signature verification algorithm to the second image.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 illustrates an algorithm address table (ALGADT) stored in advance in a system-on-chip according to an embodiment of the disclosure.

DETAILED DESCRIPTION

Below, embodiments of the disclosure will be described in detail and clearly to such an extent that an ordinary one in the art easily carries out the disclosure.

Figure 1:
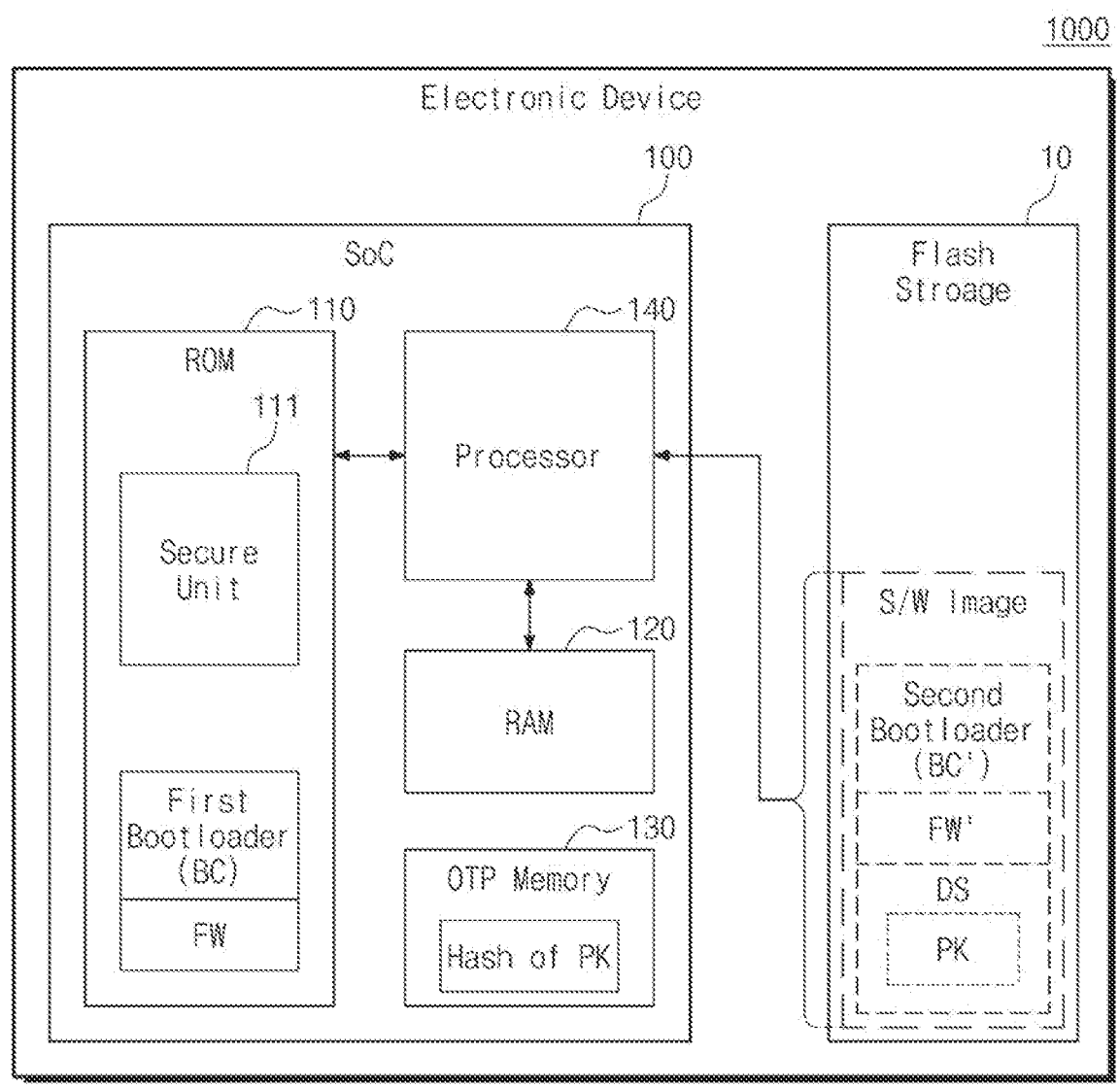
FIG. 1 is a diagram illustrating an electronic device performing secure booting.

FIG. 1 is a block diagram illustrating an electronic device 1000 performing secure booting. Referring to FIG. 1, the electronic device 1000 may include a system-on-chip (SoC) 100 and flash storage 10.

The flash storage 10 may be connected to the system-on-chip 100 so as to be removable from the system-on-chip 100. The flash storage 10 may be a device complying with the Universal Flash Storage (UFS) or embedded Multi-Media Card (eMMC) standard.

In this case, the flash storage 10 may communicate with the system-on-chip 100 based on various interfaces such as Multi-Media Card (MMC), eMMC, UFS, and embedded Universal Flash Storage (UFS) interfaces.

The flash storage 10 may store a software image. The software image may be a binary image that the user selects and is stored in the flash storage 10 by the user. However, the format of the software image is not limited thereto.

The software image may include a second bootloader, firmware data FW', and a digital signature DS. The second bootloader may include a bootloader code BC' that is executable when the operating system of the system-on-chip 100 is executed. The digital signature DS may include a public key PK to be applied to the signature verification algorithm. That is, the public key PK may be provided to the system-on-chip 100 from the flash storage 10 placed outside the system-on-chip 100.

The firmware data FW' may include an operating system code associated with an execution environment of the system-on-chip 100. The digital signature DS may be made with respect to the bootloader code BC' and/or the operating system code. The software image will be described in detail with reference to FIG. 2.

The system-on-chip 100 may include a read only memory (ROM) 110, a random access memory (RAM) 120, a one-time programmable (OTP) memory 130, and at least one processor 140. The system-on-chip 100 may further include other components for performing secure booting. In the system-on-chip 100, a portion of the read only memory 110 and the OTP memory 130 may be implemented with a root of trust (ROT).

The read only memory 110 may include at least one of various nonvolatile memories such as a flash memory, a phase-change memory, a ferroelectric memory, a magnetic memory, and a resistive memory. Below, the description will be given as the read only memory 110 is a nonvolatile memory 110.

The nonvolatile memory 110 may include a secure unit 111. A first bootloader and firmware data FW may be stored in the nonvolatile memory 110.

The first bootloader may include a bootloader code BC for booting the nonvolatile memory 110 when the system-on-chip 100 is powered up. The firmware data FW may be loaded to the random access memory 120 under control of the processor 140. The firmware data FW may include a firmware code for the operation of a basic input-output system (BIOS) in the system-on-chip 100. In addition, the firmware data FW may further include codes for activating the root of trust of the system-on-chip 100.

The secure unit 111 may perform a secure booting function under control of the processor 140. The secure unit 111 may perform the secure booting function based on a default signature verification algorithm stored in advance or a new signature verification algorithm NDSA provided from the outside (e.g., the flash storage 10). This will be described in detail later.

The random access memory 120 may be a dynamic random access memory (DRAM), but the disclosure is not limited thereto. The random access memory 120 may be one of various random access memories such as s static random access memory (SRAM), a magnetic random access memory (MRAM), a phase-change random access memory (PRAM), a ferroelectric random access memory (FRAM), and a resistive random access memory (RRAM). Below, the random access memory 120 may be described as a volatile memory 120 so as to be distinguished from the nonvolatile memory 110.

The volatile memory 120 may include a plurality of memory cells. Each of the plurality of memory cells may store 1-bit data. The software image may be loaded to the plurality of memory cells included in the volatile memory 120 under control of the processor 140. In this case, the system-on-chip 100 may perform procedures for verifying the software image and may execute the operating system included in the software image.

The OTP memory 130 may be an anti-fuse OTP memory, but embodiments of the disclosure are not limited thereto. The OTP memory 130 may be implemented with one of various memories such as a floating gate memory and an OTP fusing memory.

The data stored in the OTP memory 130 may be un-erasable and may not be lost even when the power supplied to the OTP memory 130 is blocked. However, embodiments of the disclosure are not limited thereto.

The OTP memory 130 may store a hash value of the public key PK. The public key PK may be a key to be applied to the default signature verification algorithm stored in the nonvolatile memory 110. Because only the hash value of the public key PK is stored in the nonvolatile memory 110, when the public key PK is provided from the outside (e.g., the flash storage 10), there may be a need to verify the public key PK. This will be described in detail later.

The public key PK to be applied to an algorithm depending on the default signature verification algorithm may be composed of thousands of bits. Accordingly, when the system-on-chip 100 is manufactured, only the hash value of the public key PK may be stored in the OTP memory 130, and thus, the storage capacity of the OTP memory 130 may be minimized.

The default signature verification algorithm may include at least one of a Rivest Shamir Adleman (RSA) algorithm, an Elliptic Curve Digital Signature Algorithm (ECDSA), and an Edwards-curve Digital Signature Algorithm (EdDSA). However, a type of the default signature verification algorithm is not be limited thereto.

The processor 140 may overall control operations of the components included in the system-on-chip 100. That is, the processor 140 may control the nonvolatile memory 110, the volatile memory 120, and the OTP memory 130 such that the secure booting function is performed based on the default signature verification algorithm.

The processor 140 may be implemented with a multi-core processor for the purpose of performing various operations of secure booting. This will be described in detail with reference to FIG. 2.

The processor 140 may communicate with the flash storage 10. The processor 140 may receive the software image from the flash storage 10. The processor 140 may load the received software image to the volatile memory 120 and may perform procedures for verifying the loaded software image.

Figure 2:
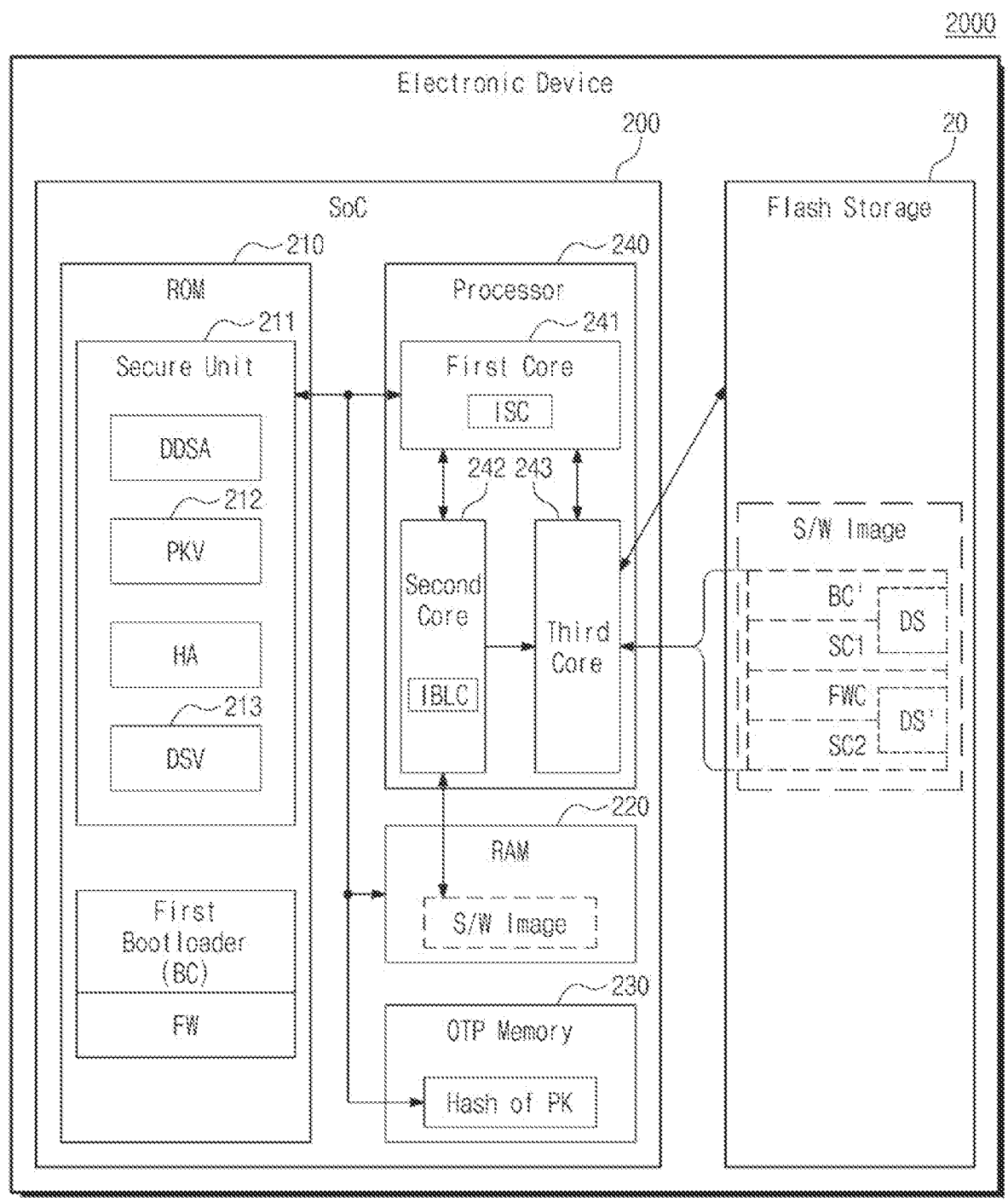
FIG. 2 is a diagram illustrating a system-on-chip (SoC) included in an electronic device in detail.

FIG. 2 is a diagram illustrating a system-on-chip (SoC) included in an electronic device in detail. In an embodiment, an SoC 200 and flash storage 20 of FIG. 2 may correspond to the system-on-chip 100 and the flash storage 10 of FIG. 1. Thus, additional description associated with similar components and similar operations will be omitted to omit redundancy.

Referring to FIG. 2, an electronic device 2000 may include the system-on-chip 200 and the flash storage 20.

The flash storage 20 may include the software image. The software image may include the bootloader code BC', a first secure code SC1, a first signature DS for the bootloader code BC' and the first secure code SC1, a firmware code FWC, a second secure code SC2, and a second signature DS' for the firmware code FWC and the second secure code SC2.

The bootloader code BC' of FIG. 2 may correspond to the bootloader code BC' included in the second bootloader of FIG. 1. The firmware code FWC of FIG. 2 may correspond to the operating system code included in the firmware data FW' of FIG. 1.

The first secure code SC1 and the second secure code SC2 may be codes for a secure process of at least one processor 240. The bootloader code BC' and the firmware code FWC may be codes for a boot loading process of the processor 240.

The first signature DS and the second signature DS' may be generated by a common private key or by different private keys. Below, the description will be given as the first signature DS and the second signature DS' are generated by the same private key.

The first signature DS may be generated by using hash values calculated by applying a hash function to each of the bootloader code BC' and the first secure code SC1. That is, the first signature DS may be a digital signature generated with respect to the bootloader code BC' and the first secure code SC1, by applying the common private key and a signature generation algorithm to the calculated hash values.

The second signature DS' may be generated by using hash values calculated by applying the hash function to each of the firmware code FWC and the second secure code SC2. That is, the second signature DS' may be a digital signature generated with respect to the firmware code FWC and the second secure code SC2, by applying the common private key and the signature generation algorithm to the calculated hash values.

The first signature DS may include a common public key corresponding to the common private key used to generate the first signature DS. The second signature DS' may include a common public key corresponding to the common private key used to generate the second signature DS'.

A secure unit 211 included in a nonvolatile memory 210 may include a public key verifier (PKV) 212 and a digital signature verifier (DSV) 213. A default signature verification algorithm DDSA and a hash algorithm HA may be stored in the secure unit 211. The public key verifier 212 and the digital signature verifier 213 may operate under control of the processor 240.

The bootloader code BC', the first secure code SC1, the first signature DS for the bootloader code BC' and the first secure code SC1, the firmware code FWC, the second secure code SC2, and the second signature DS' for the firmware code FWC and the second secure code SC2 may be loaded to the volatile memory 220 under control of the processor 240.

The secure unit 211 may further include components capable of loading the default signature verification algorithm DDSA and the software image to the nonvolatile memory 210. In this case, the processor 240 may load the received software image to a volatile memory 220 after being first loaded to the nonvolatile memory 210.

The processor 240 may include a first core 241, a second core 242, and a third core 243. That is, the processor 240 of FIG. 2 may be implemented with a multi-core processor to perform various operations associated with the secure booting of the system-on-chip 200.

The first core 241 may include a secure core. The first core 241 may be implemented to perform security-related operations. The first core 241 may be implemented to provide more improved security than the second core 242 and the third core 243.

The first core 241 may execute an internal secure code ISC based on a central processing unit (CPU) instruction programmed therein. The CPU instruction may be defined as an instruction programmed in an advanced RISC machine (ARM) core. In initialization (or booting), the first core 241 may be implemented to execute the internal secure code ISC associated with the security of the system-on-chip 200 such that an initial secure process is performed.

The second core 242 may be a core for the booting of the system-on-chip 200. The second core 242 may execute an internal bootloading code IBLC based on a CPU instruction programmed therein. In initialization (or booting), the second core 242 may be implemented to execute the internal bootloading code IBLC associated with the boosting of the system-on-chip 200 such that the codes loaded to the volatile memory 220 are loaded to the first core 241, the second core 242, and the third core 243.

The third core 243 may be a core for communication with the flash storage 20. For example, third core 243 may access the flash storage 20 based on a command from the first core 241. The third core 243 may receive the software image from the flash storage 20.

The first core 241 may read an OTP memory 230 to determine whether version information about the new signature verification algorithm NDSA is programmed. When the version information is not programmed, the first core 241 may execute the default signature verification algorithm DDSA.

The first core 241 may execute the internal secure code ISC and may calculate a hash value of the public key PK included in the first signature DS by using a hash algorithm. The hash algorithm may include the hash function.

Under control of the first core 241, the public key verifier 212 may perform a public key (PK) verification operation based on the hash value of the public key PK read from the OTP memory 230 and the calculated hash value.

For example, the public key verifier 212 may perform the public key verification operation by comparing the hash value of the read public key PK and the calculated hash value. However, the public key verification operation is not limited thereto. The public key verifier 212 may further include various components capable of performing the public key verification operation.

When the public key verification operation is successful, the digital signature verifier 213 may perform a signature verification operation under control of the first core 241.

The digital signature verifier 213 may perform first verification on the bootloader code BC' and the first secure code SC1. For example, the first verification may correspond to bootloader verification.

The first core 241 may execute the internal secure code ISC to apply the hash algorithm to each of the bootloader code BC' and the first secure code SC1 such that hash values thereof are calculated.

The first core 241 may execute the internal secure code ISC to apply the first signature DS and the default signature verification algorithm DDSA to the calculated hash values. The digital signature verifier 213 may perform the first verification on the first signature DS by using the public key PK in the default signature verification algorithm DDSA.

However, the disclosure is not limited thereto. For example, the digital signature verifier 213 may further include various components capable of performing the first verification. The digital signature verifier 213 may determine whether the bootloader code BC' and the first secure code SC1 are altered, based on a result of the first verification.

When the first verification succeeds, the first core 241 may transmit a verification success signal to the second core 242. When the first verification fails, the first core 241 may transmit a verification fail signal to the second core 242. When the verification fail signal is transmitted to the second core 242, the initialization or booting process may be stopped.

The second core 242 may perform first booting based on the verification success signal. The second core 242 may execute the internal bootloading code IBLC to load the first secure code SC1 to the first core 241. In this case, the authority to perform the secure process may be handed over from the internal secure code ISC to the first secure code SC1.

The second core 242 may execute the internal bootloading code IBLC to load the bootloader code BC' to the second core 242. In this case, the authority to perform the boot loading process may be handed over from the internal bootloading code IBLC to the bootloader code BC'.

After the first secure code SC1 is loaded to the first core 241, the first core 241 may execute the first secure code SC1 based on the CPU command programmed therein.

The first core 241 may execute the first secure code SC1 and may calculate a hash value of the public key PK included in the second signature DS' by using the hash algorithm. The common public key included in the second signature DS' may be the same as the common public key included in the first signature DS.

Under control of the first core 241, the public key verifier 212 may perform the public key verification operation based on the hash value of the public key PK read from the OTP memory 230 and the calculated hash value. Additional description associated with the public key verification operation will be omitted to avoid redundancy.

When the public key verification operation is successful, the digital signature verifier 213 may perform the signature verification operation under control of the first core 241.

The digital signature verifier 213 may perform second verification on the firmware code FWC and the second secure code SC2. For example, the second verification may correspond to firmware verification.

The first core 241 may execute the first secure code SC1 to apply the hash algorithm to each of the firmware code FWC and the second secure code SC2 such that hash values thereof are calculated.

The first core 241 may execute the first secure code SC1 to apply the calculated hash values to the second signature DS' and the default signature verification algorithm DDSA. The digital signature verifier 213 may perform the second verification on the second signature DS' by using the public key PK in the default signature verification algorithm DDSA.

However, the disclosure is not limited thereto. For example, the digital signature verifier 213 may further include various components capable of performing the second verification. The digital signature verifier 213 may determine whether the firmware code FWC and the second secure code SC2 are altered, based on a result of the second verification.

When the second verification succeeds, the first core 241 may transmit the verification success signal to the second core 242. When the second verification fails, the first core 241 may transmit the verification fail signal to the second core 242. When the verification fail signal is transmitted to the second core 242, the initialization or booting process may be stopped.

The second core 242 may perform second booting based on the verification success signal. The second core 242 may execute the bootloader code BC' based on the CPU instruction programmed therein such that the second secure code SC2 is loaded to the first core 241. In this case, the authority to perform the secure process may be handed over from the first secure code SC1 to the second secure code SC2.

The second core 242 may execute the bootloader code BC' to load the firmware code FWC to the second core 242 and the third core 243.

The second core 242 may execute the bootloader code BC' to load a code corresponding to the second core 242 from among the firmware code FWC to the second core 242. The second core 242 may execute the bootloader code BC' to load a code corresponding to the third core 243 from among the firmware code FWC to the third core 243.

In this case, the authority to perform the boot loading process may be handed over from the bootloader code BC' to the firmware code FWC. Accordingly, the authority to operate the system-on-chip 200 may be handed over from the bootloader code BC' to the firmware code FWC.

The second core 242 and the third core 243 may drive the system-on-chip 200 by executing the loaded firmware code FWC based on the CPU instructions programmed therein. The firmware code FWC may include an operating system code associated with an execution environment of the system-on-chip 200.

Figure 3:
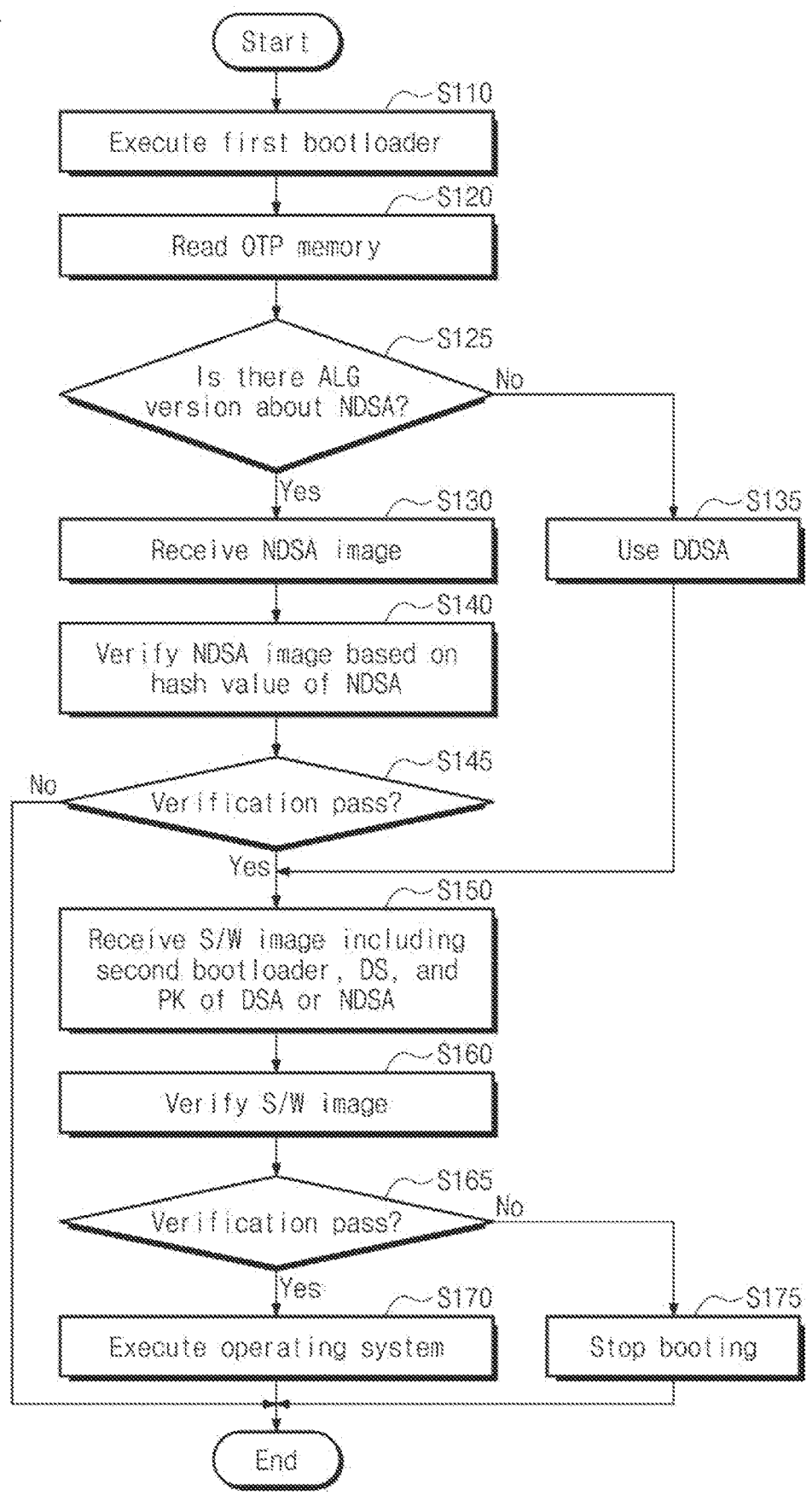
FIG. 3 is a flowchart of an operating method of a system-on-chip (SoC) performing secure booting based on a selected signature verification algorithm, according to an embodiment of the disclosure.

FIG. 3 is a flowchart of an operating method of a system-on-chip (SoC) performing secure booting based on a selected signature verification algorithm, according to an embodiment of the disclosure.

Referring to FIGS. 2 and 3, in operation S110, as the system-on-chip 200 is powered on, the system-on-chip 200 may execute the first bootloader. The first bootloader may include the bootloader code BC executable in the booting of the nonvolatile memory 210.

In operation S120, the system-on-chip 200 may read the OTP memory 230. The system-on-chip 200 may determine whether version information about the new signature verification algorithm NDSA is programmed in the OTP memory 230.

When it is determined in operation S125 that the version information is absent from the OTP memory 230, operation S135 may be performed. In operation S135, the system-on-chip 200 may use the default signature verification algorithm DDSA stored therein.

When it is determined in operation S125 that the version information is present in the OTP memory 230, operation S130, operation S140, and operation and S145 may be performed. A configuration in which version information is programmed will be described in detail with reference to FIGS. 4 and 7.

In operation S130, the system-on-chip 200 may receive an image (hereinafter referred to as an "NDSA image") of the new signature verification algorithm NDSA from the flash storage 20. The NDSA image may be a software image. For example, the NDSA image may be a binary image that is developed by the user and is then stored in the flash storage 10 by the user. However, the format of the NDSA image is not limited thereto.

In operation S140, the system-on-chip 200 may verify the NDSA image based on a hash value of the new signature verification algorithm NDSA. The hash value of the new signature verification algorithm NDSA will be described in detail with reference to FIGS. 4 and 7. A configuration in which the NDSA image is verified will be described in detail with reference to FIGS. 6, 9A, and 9B.

When the verification of the NDSA image fails in operation S145, the procedure ends. When the verification of the NDSA image succeeds in operation S145, operation S150, operation S160, and operation S165 may be performed.

In operation S150, the system-on-chip 200 may receive the software image from the flash storage 20. The software image may include the public key PK of the digital signature verification algorithm, the second bootloader, and the digital signature.

When operation S150 is performed after operation S135, the software image may include the public key PK of the default signature verification algorithm DDSA. When operation S150 is performed after operation S145, the software image may include the public key PK of the new signature verification algorithm NDSA. The public key PK will be described in detail with reference to FIGS. 4 and 7.

In operation S160, the system-on-chip 200 may verify the software image. The system-on-chip 200 may perform procedures for verifying a signature made on a plurality of codes included in the software image.

When the verification of the software image fails in operation S165, operation S175 may be performed. In operation S175, the initialization or booting process may be stopped.

When the verification of the software image succeeds in operation S165, operation S170 may be performed. Operation S160 and operation S165 will be described in detail with reference to FIGS. 9A and 9B.

In operation S170, the system-on-chip 200 may execute the operating system. That is, the system-on-chip 200 may execute the operating system developed by the user, based on a procedure for verifying the software image.

Figure 4:
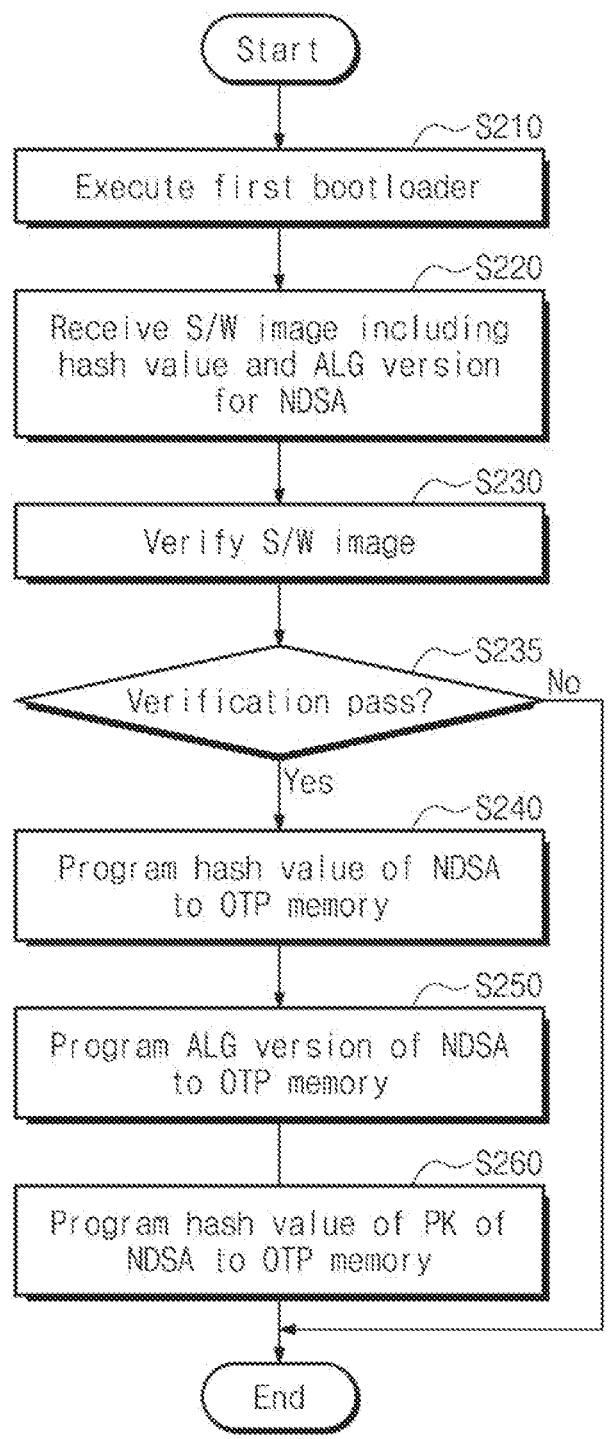
FIG. 4 is a flowchart of an operating method of a system-on-chip (SoC) recording hash values and version information in a one-time programmable (OTP) memory, according to an embodiment of the disclosure.

FIG. 4 is a flowchart of an operating method of a system-on-chip (SoC) recording hash values and version information in an OTP memory, according to an embodiment of the disclosure.

Referring to FIGS. 2 to 4, in operation S210, as the system-on-chip 200 is powered on, the system-on-chip 200 may execute the first bootloader. Operation S210 of FIG. 4 may correspond to operation S110 of FIG. 3.

In operation S220, the system-on-chip 200 may further receive the software image, which further includes the hash value of the new signature verification algorithm NDSA, the hash value of the public key PK, and an algorithm version in addition to the public key for the new signature verification algorithm NDSA, the second bootloader, and the digital signature, from the flash storage 20. The software image will be described in detail with reference to FIG. 5.

In operation S230, the system-on-chip 200 may verify the software image. Operation S230 of FIG. 4 may correspond to operation S160 of FIG. 3.

When the verification of the software image succeeds in operation S235, operation S240, operation S250 and operation S260 may be performed. Operation S235 of FIG. 4 may correspond to operation S165 of FIG. 3. When the verification of the software image fails in operation S235, the procedure ends.

In operation S240, the system-on-chip 200 may program the hash value of the new signature verification algorithm NDSA in the OTP memory 230. In operation S250, the system-on-chip 200 may program the algorithm version of the new signature verification algorithm NDSA in the OTP memory 230. In operation S260, the system-on-chip 200 may program the hash value of the public key PK of the new signature verification algorithm NDSA in the OTP memory 230.

In operation S240, operation S250, and operation S260, the system-on-chip 200 may program the hash values and the algorithm version in different areas of the OTP memory 230. A code for programming the hash values and the algorithm version may be present in the system-on-chip 200 or may be included in the software image. The OTP memory 230 will be described in detail with reference to FIGS. 7 and 11.

Figure 5:
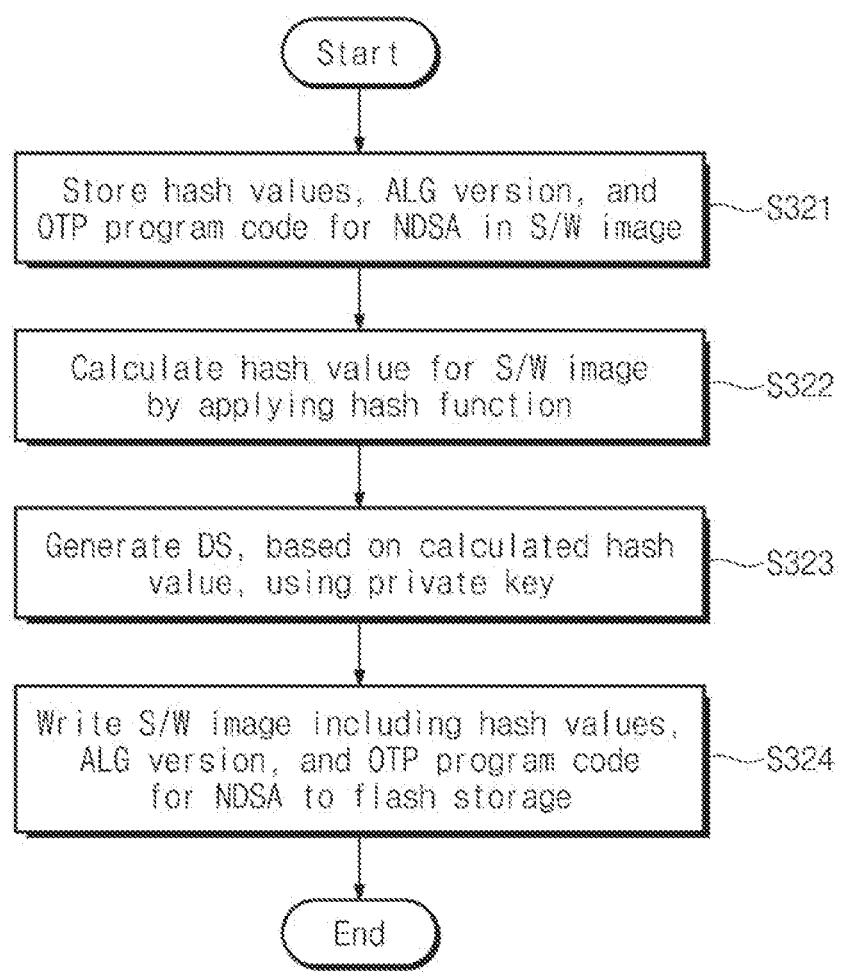
FIG. 5 is a flowchart of a method in which a software image including a digital signature is recorded at flash storage according to one or more embodiments of the disclosure.

FIG. 5 is a flowchart of a method in which a software image including a digital signature is recorded at flash storage according to one or more embodiments of the disclosure.

Referring to FIGS. 2 and 5, in operation S321, hash values of the new signature verification algorithm NDSA, an algorithm version, and an OTP program code may be stored in the software image. In this case, the program operation for the hash values and the algorithm version may be performed by the software image received from the flash storage 20.

Alternatively, the OTP program code may be stored in the processor 240. For example, the OTP program code may be stored in the processor 240 in a hard coding scheme while the system-on-chip 200 is manufactured. In this case, the program operation for the hash values and the algorithm version may be performed by the processor 240. This will be described in detail with reference to FIG. 7.

The hash values may include the hash value of the new signature verification algorithm NDSA itself and the hash value of the public key PK to be applied to the new signature verification algorithm NDSA.

The hash values may be calculated by applying the hash algorithm (or hash function) to each of the new signature verification algorithm NDSA and the public key PK to be applied to the new signature verification algorithm NDSA.

The algorithm version of the new signature verification algorithm NDSA may include a plurality of versions of the new signature verification algorithm NDSA. This will be described in detail with reference to FIG. 10.

The OTP program code may be a code for programming the hash values and the algorithm version in the OTP memory 230. The OTP program code may include data on addresses of areas where the hash values and the algorithm version are respectively programmed.

In operation S322, the hash value of the software image may be calculated by using the hash function. The hash function may be the same as or different from the hash function included in the hash algorithm described with reference to FIG. 2. The software image may include a bootloader code, a first secure code, a firmware code, and a second secure code.

In operation S323, the digital signature may be generated by applying the private key and the signature generation algorithm to the hash values calculated with respect to the codes included in the software image. The digital signature may include a first signature associated with the bootloader code and the first secure code included in the software image and a second signature associated with the firmware code and the second secure code included in the software image.

The private key may correspond to a key of the user developing the operating system. A public key corresponding to the private key may be included in each of the first signature and the second signature.

In operation S324, the software image including the hash values, the algorithm version, and the OTP program code may be recorded at the flash storage 20.

However, some or all of the hash values of the new signature verification algorithm NDSA, the algorithm version, and the OTP program code may be recorded at different software images. In this case, the system-on-chip 200 may program the hash values and the algorithm version in the OTP memory 230 while updating the software image. This will be described in detail with reference to FIGS. 8A to 8D.

Figure 6:
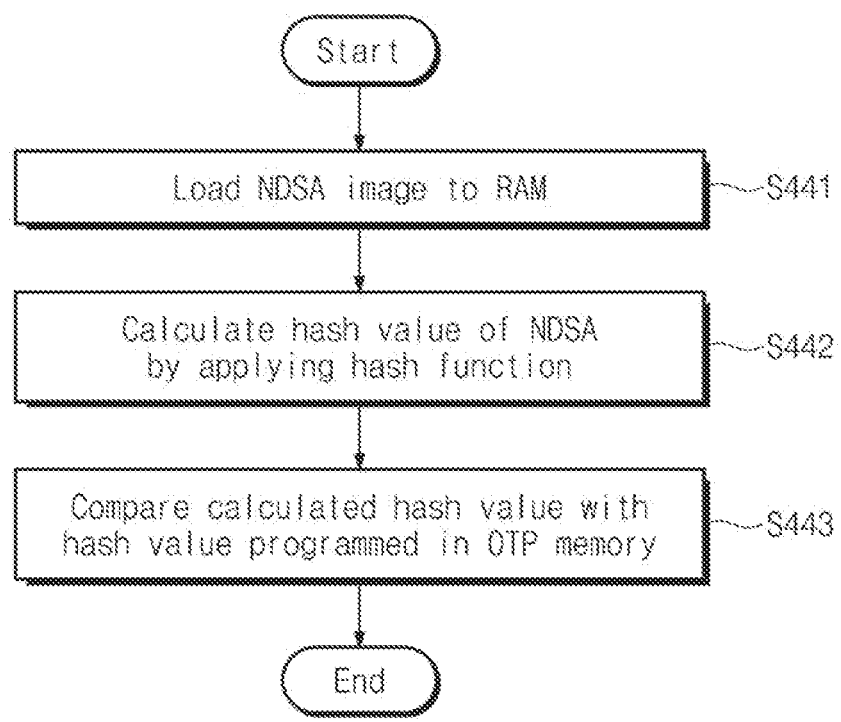
FIG. 6 is a flowchart of an operating method of a system-on-chip (SoC) verifying a new algorithm, according to an embodiment of the disclosure.

FIG. 6 is a flowchart of an operating method of a system-on-chip (SoC) verifying a new algorithm, according to an embodiment of the disclosure.

Referring to FIGS. 2 and 6, in operation S441, the system-on-chip 200 may load the NDSA image to the volatile memory 220. The system-on-chip 200 may load pieces of information about the NDSA image in different areas of the volatile memory 220 depending on the algorithm version of the new signature verification algorithm NDSA. This will be described in detail with reference to FIG. 10.

In operation S442, the system-on-chip 200 may calculate the hash value of the new signature verification algorithm NDSA by using the hash function. That is, the system-on-chip 200 may execute an internal secure code to execute a hash algorithm code.

In operation S443, the system-on-chip 200 may compare the calculated hash value of the new signature verification algorithm NDSA and the hash value programmed in the OTP memory 230. The programmed hash value may mean the hash value of the new signature verification algorithm NDSA itself.

The system-on-chip 200 may verify the NDSA image through operation S441 to operation S443. As such, only the new signature verification algorithm NDSA whose safety is verified may be executed in the system-on-chip 200. This will be described in detail with reference to FIGS. 9A and 9B.

Figure 7:
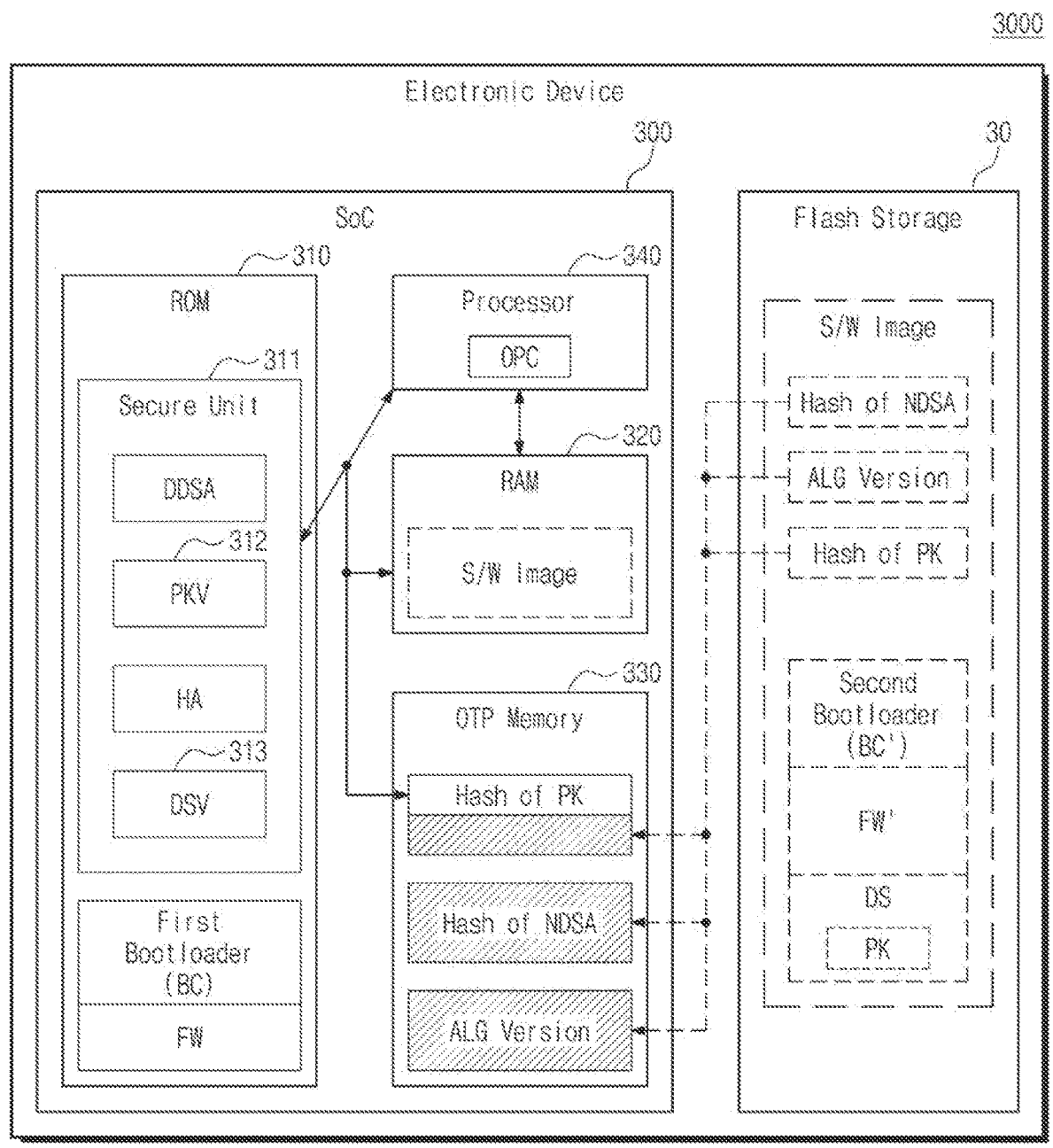
FIG. 7 is a diagram illustrating a system-on-chip (SoC) recording hash values and version information, according to an embodiment of the disclosure.

FIG. 7 is a diagram illustrating a system-on-chip (SoC) recording hash values and version information, according to an embodiment of the disclosure.

In an embodiment, a system-on-chip (SoC) 300 and flash storage 30 included in an electronic device 3000 of FIG. 7 may respectively correspond to the system-on-chip 200 and the flash storage 20 included in the electronic device 2000 of FIG. 2. Thus, additional description associated with similar components and similar operations will be omitted to omit redundancy.

Referring to FIGS. 2 to 7, the flash storage 30 may store the software image. In FIG. 7, the software image may further include the hash values and the algorithm version of the new signature verification algorithm NDSA in addition to the second bootloader, the firmware data FW', and the digital signature DS.

The hash values of the new signature verification algorithm NDSA may include the hash value of the new signature verification algorithm NDSA itself and the hash value of the public key PK to be applied to the new signature verification algorithm NDSA.

The hash value of the new signature verification algorithm NDSA itself may be calculated by applying the hash algorithm (or hash function) to the new signature verification algorithm NDSA. The hash value of the public key PK to be applied to the new signature verification algorithm NDSA may be calculated by applying the hash algorithm (or hash function) to the public key PK.

Because the algorithm version of the new signature verification algorithm NDSA is not yet programmed in an OTP memory 330, at least one processor 340 may execute the default signature verification algorithm DDSA and may load the software image to a volatile memory 320.

The processor 340 may execute the default signature verification algorithm DDSA and internal codes to perform a signature verification operation including the public key verification operation, the first verification, and the second verification.

When both the verification of the public key and the verification of the signature succeed, the processor 340 may execute an OTP program code OPC based on a CPU instruction programmed therein. In this case, as described with reference to operation S321 of FIG. 5, the processor 340 may program the hash values and the version information included in the software image in different areas of the OTP memory 330.

The hash value of the public key PK to be applied to the new signature verification algorithm NDSA may be programmed at a location different from that of the hash value of the public key PK to be applied to the default signature verification algorithm DDSA. This will be described in detail with reference to FIG. 11.

FIGS. 8A to 8D illustrate embodiments of a system-on-chip (SoC) programming hash values and version information while updating a software image including the digital signature DS, according to an embodiment of the disclosure.

Figure 8A:
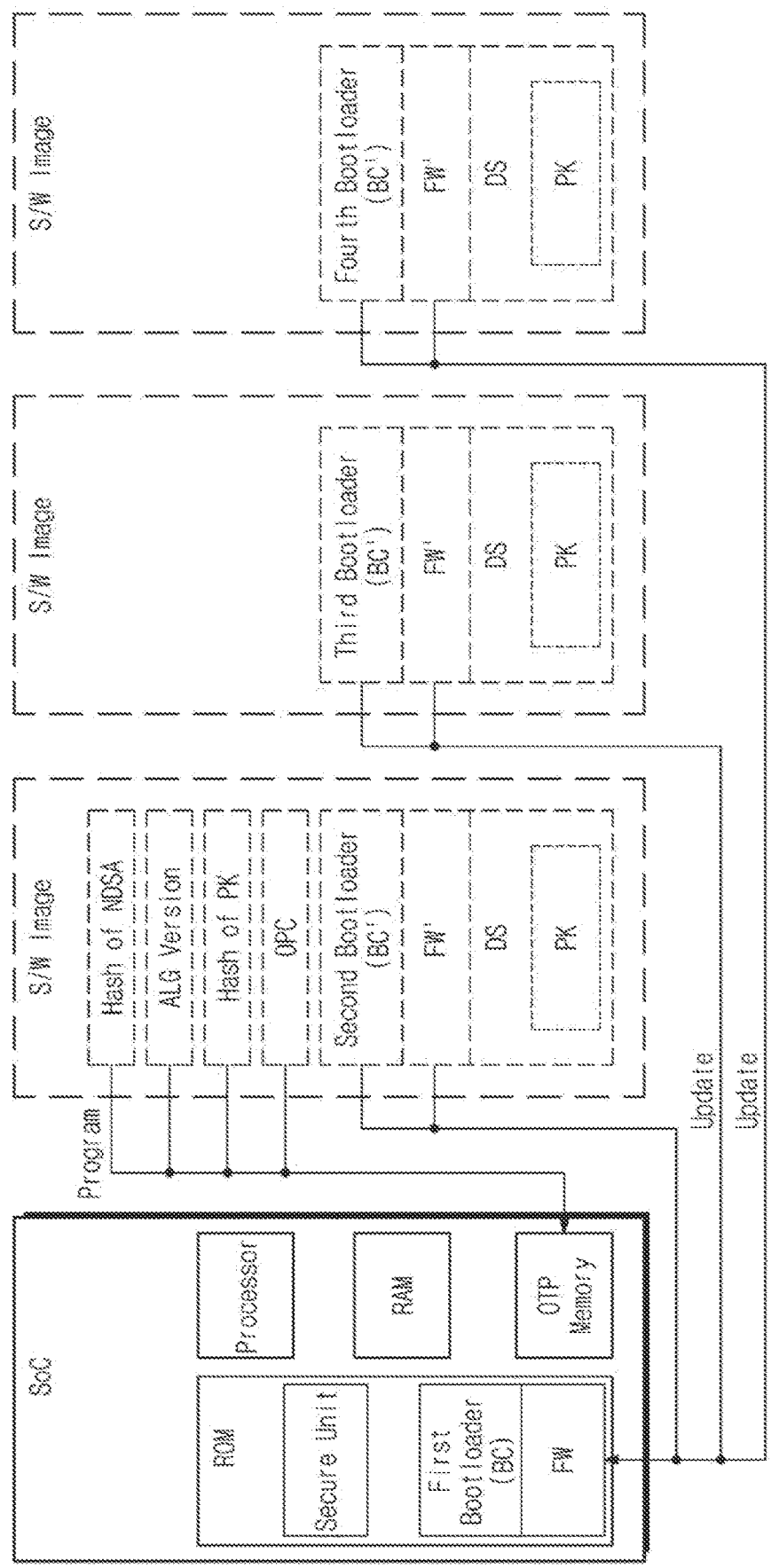
FIG. 8A illustrates embodiments of a system-on-chip programming hash values and version information while updating a software image including a digital signature, according to an embodiment of the disclosure.

Referring to FIGS. 7 and 8A, the software image including the second bootloader may include all of the hash values of the new signature verification algorithm NDSA, the algorithm version, and the OTP program code OPC.

The hash values of the new signature verification algorithm NDSA may include the hash value of the new signature verification algorithm NDSA itself and the hash value of the public key PK to be applied to the new signature verification algorithm NDSA.

The root of trust of the system-on-chip SoC is activated by the first bootloader and the firmware data FW, and the public key verification operation and the signature verification operation for the software image including the second bootloader may be performed in the system-on-chip SoC. The signature verification operation may include bootloader verification and firmware verification.

When the system-on-chip SoC succeeds in the signature verification operation, the system-on-chip SoC may execute the operating system included in the software image including the second bootloader. Also, when the system-on-chip SoC succeeds in the signature verification operation, the hash values of the new signature verification algorithm NDSA and the algorithm version may be programmed in the OTP memory 330 based on the OTP program code OPC included in the software image including the second bootloader.

That is, in FIG. 8A, the program operation may be performed by the software image including the second bootloader, not the OTP program code OPC stored in the processor 340 described with reference to FIG. 7.

Afterwards, in the operating system executed by using the software image including the second bootloader, the system-on-chip SoC may perform the public key verification operation and the signature verification operation on a software image including a third bootloader.

The software image including the third bootloader may include the firmware data FW' and the digital signature DS. The firmware code may include a code for an operating system to be executed in booting of the third bootloader. The digital signature DS may include the first signature and the second signature described above. Each of the first signature and the second signature may include a public key for the new signature verification algorithm NDSA.

When the signature verification operation for the software image including the third bootloader succeeds, the system-on-chip SoC may perform the public key verification operation and the signature verification operation on a software image including a fourth bootloader in another operating system executed by using the software image including the third bootloader.

Likewise, the software image including the fourth bootloader may include the firmware data FW' and the digital signature DS. The firmware code may include a code for an operating system to be executed in booting of the fourth bootloader. The digital signature DS may include the first signature and the second signature described above. Each of the first signature and the second signature may include a public key for the new signature verification algorithm NDSA.

Figure 8B:
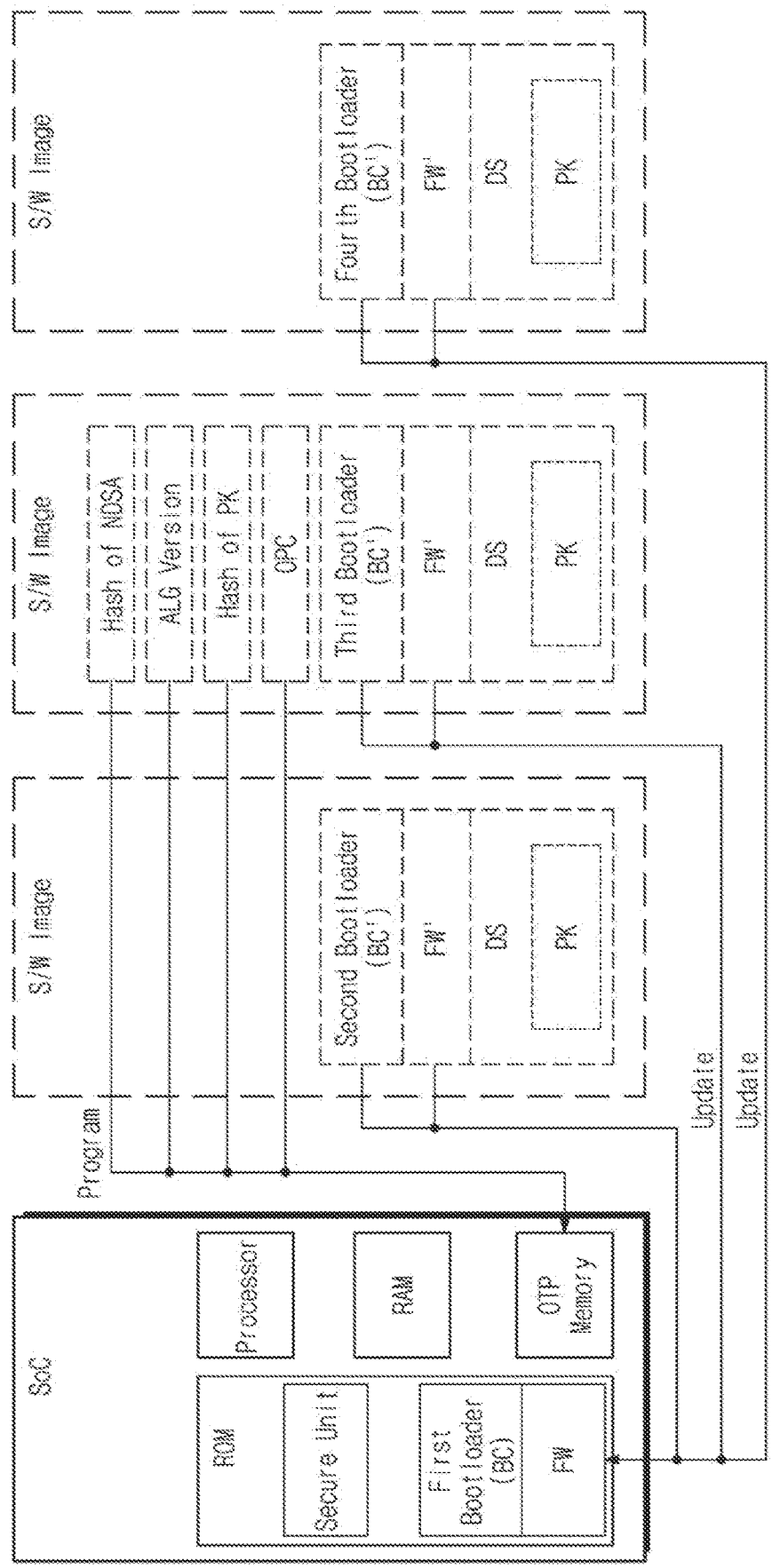
FIG. 8B illustrates embodiments of a system-on-chip programming hash values and version information while updating a software image including a digital signature, according to an embodiment of the disclosure.

Referring to FIGS. 7 and 8B, the software image including the third bootloader may include all of the hash values of the new signature verification algorithm NDSA, the algorithm version, and the OTP program code OPC. In FIG. 8B, the description that is the same as the description given with reference to FIG. 8A is omitted.

The system-on-chip SoC may perform the public key verification operation and the signature verification operation on the software image including the second bootloader. When the system-on-chip SoC succeeds in the signature verification operation, the system-on-chip SoC may execute the operating system included in the software image including the second bootloader and may perform the public key verification operation and the signature verification operation on the software image including the third bootloader.

When the system-on-chip SoC succeeds in the signature verification operation, the hash values of the new signature verification algorithm NDSA and the algorithm version may be programmed in the OTP memory 330 based on the OTP program code OPC included in the software image including the third bootloader.

That is, in FIG. 8B, the program operation may be performed by the software image including the third bootloader, not the software image including the second bootloader.

Figure 8C:
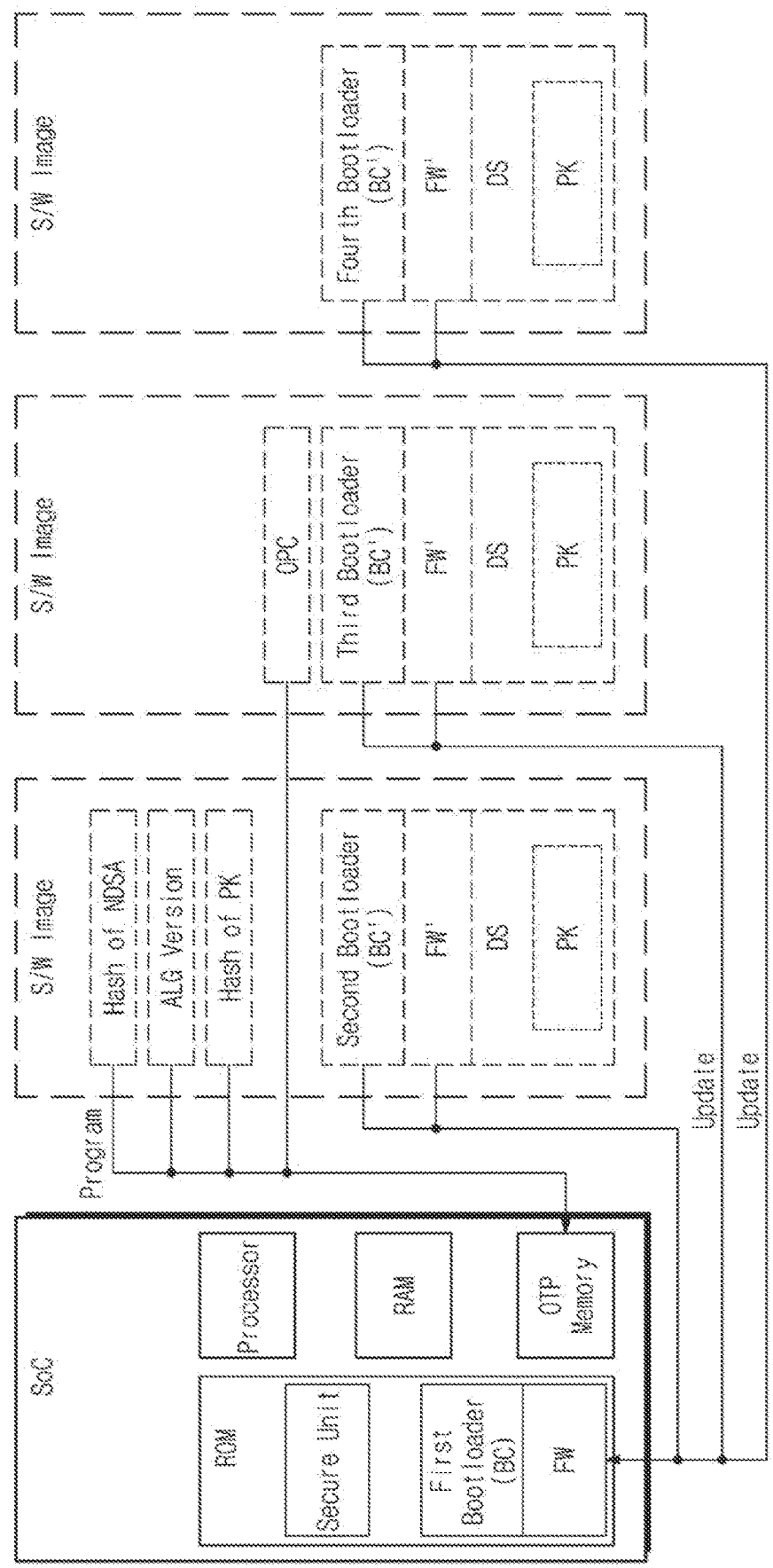
FIG. 8C illustrates embodiments of a system-on-chip programming hash values and version information while updating a software image including a digital signature, according to an embodiment of the disclosure.

Referring to FIGS. 7 and 8C, the software image including the second bootloader may include the hash values of the new signature verification algorithm NDSA and the algorithm version. The software image including the third bootloader may include the OTP program code OPC. In FIG. 8C, the description that is the same as the description given with reference to FIGS. 8A and 8B is omitted.

The system-on-chip SoC may perform the public key verification operation and the signature verification operation on the software image including the second bootloader. When the system-on-chip SoC succeeds in the signature verification operation, the system-on-chip SoC may execute the operating system included in the software image including the second bootloader.

Also, the algorithm version and the hash values of the new signature verification algorithm NDSA included in the software image including the second bootloader may be stored in the system-on-chip SoC. Afterwards, the system-on-chip SoC may perform the public key verification operation and the signature verification operation on the software image including the third bootloader.

When the system-on-chip SoC succeeds in the signature verification operation, the algorithm version and the hash values of the new signature verification algorithm NDSA stored in the system-on-chip SoC may be programmed in the OTP memory 330 based on the OTP program code OPC included in the software image including the third bootloader.

That is, the program operation for the algorithm version and the hash values of the new signature verification algorithm NDSA may be performed based on different software images.

Figure 8D:
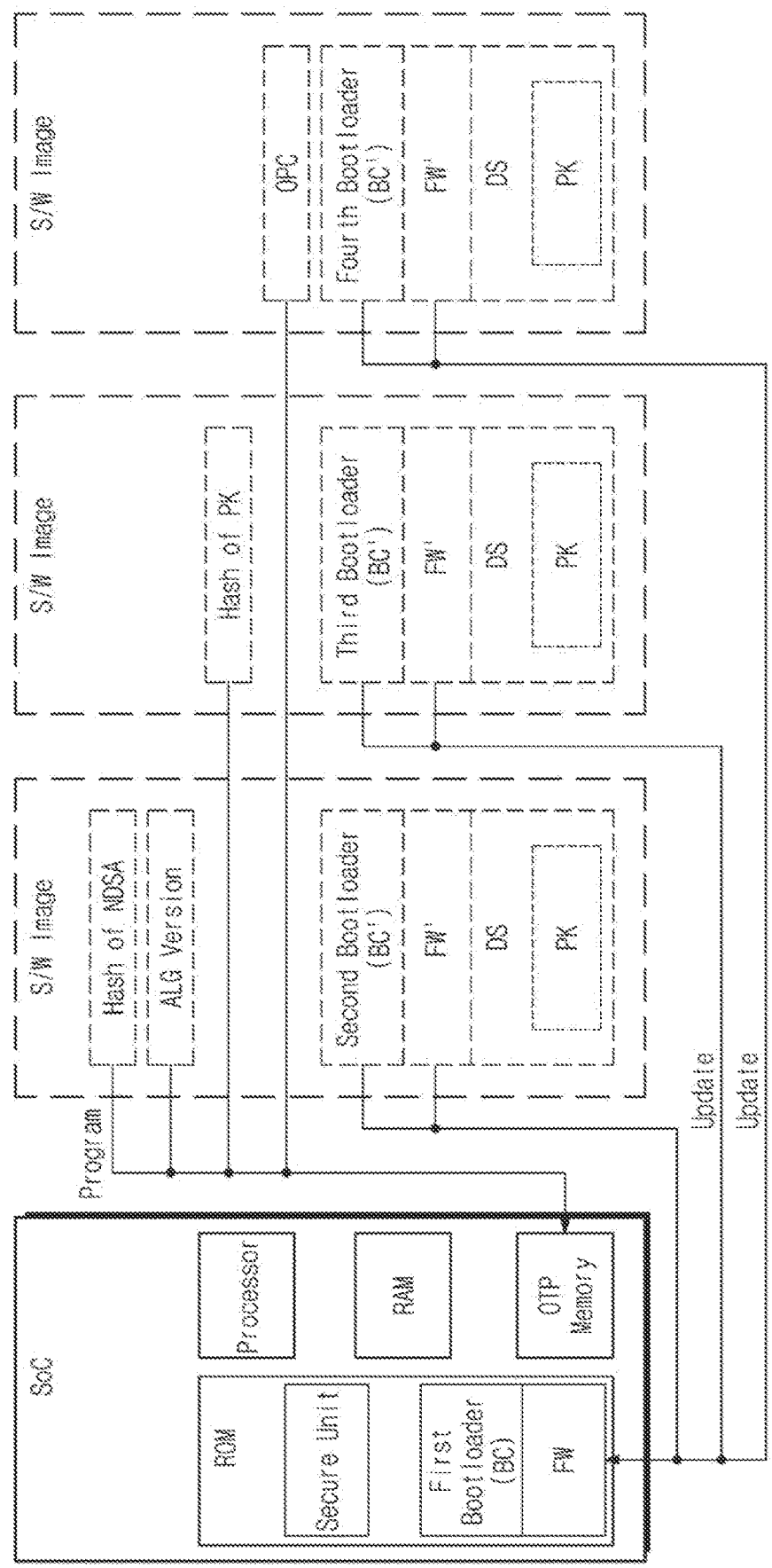
FIG. 8D illustrates embodiments of a system-on-chip programming hash values and version information while updating a software image including a digital signature, according to an embodiment of the disclosure.

Referring to FIGS. 7 and 8D, the software image including the second bootloader may include the hash values of the new signature verification algorithm NDSA itself and the algorithm version of the new signature verification algorithm NDSA.

The software image including the third bootloader may include the hash value of the public key PK to be applied to the new signature verification algorithm NDSA. The software image including the fourth bootloader may include the OTP program code OPC. In FIG. 8D, the description that is the same as the description given with reference to FIGS. 8A to 8C is omitted.

The system-on-chip SoC may perform the public key verification operation and the signature verification operation on the software image including the second bootloader. When the system-on-chip SoC succeeds in the signature verification operation, the system-on-chip SoC may execute the operating system included in the software image including the second bootloader.

Also, the algorithm version and the hash value of the new signature verification algorithm NDSA itself included in the software image including the second bootloader may be stored in the system-on-chip SoC. Afterwards, the system-on-chip SoC may perform the public key verification operation and the signature verification operation on the software image including the third bootloader.

When the system-on-chip SoC succeeds in the signature verification operation, the system-on-chip SoC may execute the operating system included in the software image including the third bootloader. Also, the hash values of the public key PK included in the software image including the third bootloader may be stored in the system-on-chip SoC.

Afterwards, the system-on-chip SoC may perform the public key verification operation and the signature verification operation on the software image including the fourth bootloader. When the system-on-chip SoC succeeds in the signature verification operation, the system-on-chip SoC may execute the operating system included in the software image including the fourth bootloader.

Also, the system-on-chip SoC may program the algorithm version and the hash values of the new signature verification algorithm NDSA stored in the system-on-chip SoC in the OTP memory 330 based on the OTP program code OPC included in the software image including the fourth bootloader.

That is, in FIG. 8D, the program operation for the algorithm version and the hash values of the new signature verification algorithm NDSA may be performed based on different software images.

In FIGS. 8A to 8D, three software images are illustrated, but the number of software images may be 4 or more. In this case, some or all of the hash value of the new signature verification algorithm NDSA itself, the algorithm version, the hash value of the public key PK to be applied to the new signature verification algorithm NDSA, and the OTP program code OPC may be included in different software images.

Accordingly, the program operation for the algorithm version and the hash values of the new signature verification algorithm NDSA may be performed based in whole or in part on different software images.

Figure 9A:
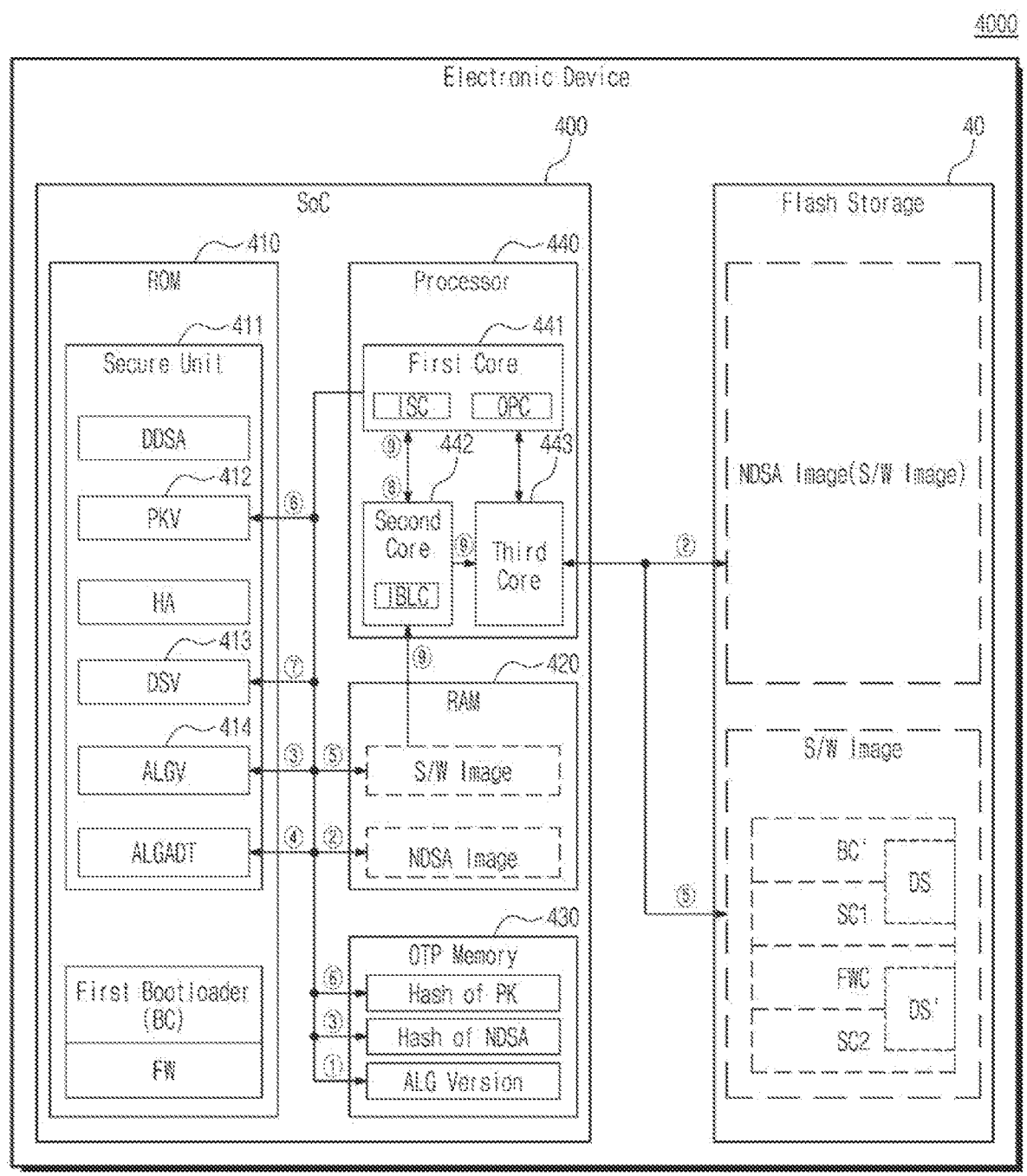
FIG. 9A is a diagram illustrating a system-on-chip (SoC) performing secure booting based on a new signature verification algorithm, according to an embodiment of the disclosure.
Figure 9B:
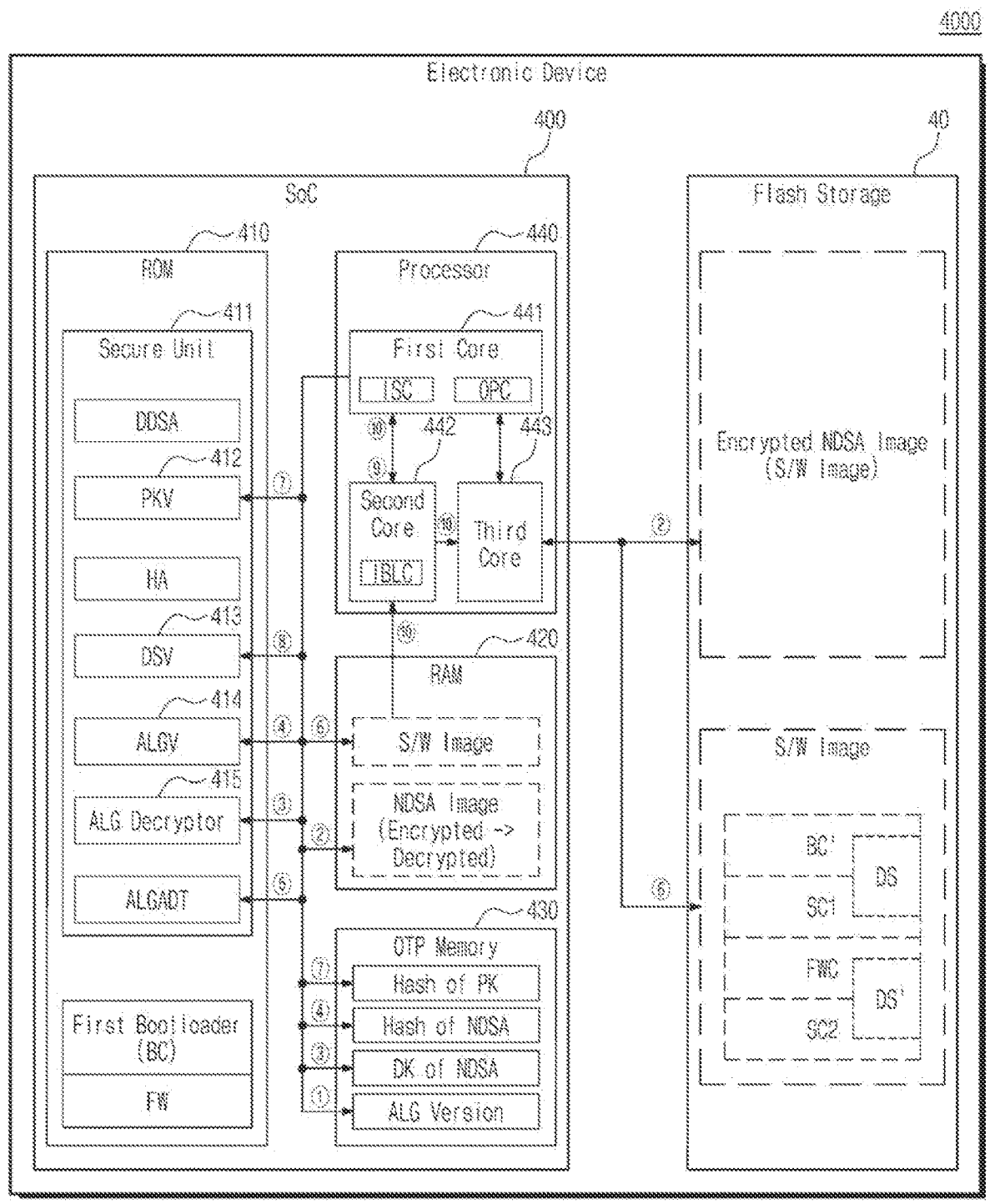
FIG. 9B is a diagram illustrating a system-on-chip (SoC) performing secure booting based on a new signature verification algorithm, according to an embodiment of the disclosure.

FIGS. 9A and FIG. 9B are diagrams illustrating a system-on-chip (SoC) performing secure booting based on a new signature verification algorithm, according to an embodiment of the disclosure.

An embodiment in which secure booting is performed based on an NDSA image not encrypted will be described with reference to FIG. 9A. An embodiment in which secure booting is performed based on an NDSA image encrypted will be described with reference to FIG. 9B.

In an embodiment, a system-on-chip (SoC) 400 and flash storage 40 included in an electronic device 4000 of FIGS. 9A and 9B may respectively correspond to the system-on-chip 300 and the flash storage 30 included in the electronic device 3000 of FIG. 7. Thus, additional description associated with similar components and similar operations will be omitted to omit redundancy.

Referring to FIG. 9A, the electronic device 4000 may include the system-on-chip 400 and the flash storage 40. The flash storage 40 may include the software image and the NDSA image. The above description given with reference to the software image will be omitted.

The NDSA image may be in the form of a software image. The NDSA image may be a binary image that the user selects and is stored in the flash storage 40 by the user. However, the format of the NDSA image is not limited thereto.

The algorithm version of the new signature verification algorithm NDSA included in the NDSA image may be the same as the algorithm version of the new signature verification algorithm NDSA programmed in an OTP memory 430. The first signature DS and the second signature DS' included in the software image may include the public key for the new signature verification algorithm NDSA.

A secure unit 411 included in a nonvolatile memory 410 may include a public key verifier 412, a digital signature verifier 413, and an algorithm verifier (ALGV) 414. A digital signature verification algorithm (DDSA), a hash algorithm (HA), and an algorithm address table (ALGADT) may be stored in the secure unit 411.

The public key verifier 412, the digital signature verifier 413, and the algorithm verifier 414 may operate under control of at least one processor 440. Under control of the processor 440, the first signature DS and the second signature DS' each including the public key of the new signature verification algorithm NDSA may be loaded to a volatile memory 420.

The processor 440 may include a first core 441, a second core 442, and a third core 443. The first core 441 may execute the internal secure code ISC and the OTP program code OPC. The second core 242 may execute the internal bootloading code IBLC Below, operations in which the initialization or booting process is performed based on the first core 441, the second core 442, and the third core 443 when the root of trust is activated based on the first bootloader and the firmware data FW will be described with reference to FIG. 9A.

At the first operation, the first core 441 may read the OTP memory 430 based on the stored OTP program code OPC to determine whether version information about the new signature verification algorithm NDSA is programmed. When the version information is programmed, the first core 441 may perform a verification procedure for the new signature verification algorithm NDSA.

At the second operation, the third core 443 may receive the NDSA image from the flash storage 40 based on a command from the first core 441. The first core 441 may load the received NDSA image at a specific location of the volatile memory 420. The first core 441 may load the NDSA image in a different area of the volatile memory 420 depending on the algorithm version of the new signature verification algorithm NDSA included in the NDSA image.

The third core 443 may receive the NDSA image and the software image together from the flash storage 40 based on the command from the first core 441. In this case, the first core 441 may load the software image, which is received before performing the algorithm verification operation, to the volatile memory 420. In this case, the fifth operation to be described later may be omitted.

At the third operation, the first core 441 may calculate a hash value by applying the hash algorithm to the new signature verification algorithm NDSA. The first core 441 may control the algorithm verifier 414. The algorithm verifier 414 may read the hash value of the new signature verification algorithm NDSA corresponding to the algorithm version from the OTP memory 430 and may perform the algorithm verification operation by comparing the read hash value and the calculated hash value.

When the algorithm verification succeeds, at the fourth operation, the first core 441 may execute the internal secure code ISC and may execute the NDSA image loaded to the volatile memory 420 with reference to the algorithm address table. The algorithm address table will be described in detail with reference to FIG. 10.

At the fifth operation, the third core 443 may receive the software image from the flash storage 40 based on the command from the first core 441. The first core 441 may load the received software image to the volatile memory 420.

At the sixth operation, under control of the first core 441, the public key verifier 412 may perform the public key (PK) verification operation based on the hash value read from the OTP memory 430 and the calculated hash value. Additional description associated with the public key verification operation will be omitted to avoid redundancy.

As described above, when the signature verification based on the default signature verification algorithm DDSA succeeds, the hash value of the public key PK to be applied to the new signature verification algorithm NDSA may be programmed in the OTP memory 430.

The public key PK to be applied to the new signature verification algorithm NDSA may be thousands of bits. Accordingly, only the hash value of the public key PK may be stored in the OTP memory 430; in this case, the storage capacity of the OTP memory 430 may be minimized.

The new signature verification algorithm NDSA may include a PQC (Post-Quantum Cryptography) algorithm. The PQC (Post-Quantum Cryptography) algorithm may have a plurality of algorithm versions. However, a type of the new signature verification algorithm NDSA is not be limited thereto.

When the public key verification succeeds, at the seventh operation, the first core 441 may execute the internal codes ISC and SC1 and may apply the new signature verification algorithm NDSA to the first signature DS and the second signature DS' by using the public key PK.

The digital signature verifier 413 may perform the bootloader verification and the firmware verification under control of the first core 441. The digital signature verifier 413 may determine whether the bootloader code BC, the first secure code SC1, the firmware code FWC, and the second secure code SC2 are altered, based on verification results.

At the eighth operation, when the bootloader verification and the firmware verification succeeds, the first core 441 may transmit a verification success signal to the second core 442. When the bootloader verification or the firmware verification fails, the first core 441 may transmit the verification fail signal to the second core 442.

At the ninth operation, the second core 442 may load the first secure code SC1 and the second secure code SC2 to the first core 441 from the volatile memory 420 based on the verification success signal. The second core 442 may load the bootloader code BC to the second core 442 from the volatile memory 420. The second core 442 may load the firmware code FWC to the second core 442 and the third core 443 from the volatile memory 420.

Unlike FIG. 9A, referring to FIG. 9B, the secure unit 411 may further include an algorithm decryptor 415. The description given with reference to FIG. 9A is omitted.

At the second operation, the third core 443 may receive an encrypted NDSA image from the flash storage 40 based on a command from the first core 441. The NDSA image may be encrypted by using the private key of the user. The private key of the user may be equal to or different from a private key obtained by encrypting the software image.

The first core 441 may load the received encrypted NDSA image at a specific location of the volatile memory 420. The first core 441 may load the encrypted NDSA image in a different area of the volatile memory 420 depending on the algorithm version of the new signature verification algorithm NDSA included in the encrypted NDSA image.

At the third operation, the first core 441 may control the algorithm decryptor 415. The algorithm decryptor 415 may read a decryption key DK of the new signature verification algorithm NDSA programmed in the OTP memory 430 and may decrypt the encrypted NDSA image.

The decryption key DK may be programmed in the OTP memory 430 through the program operation of the system-on-chip 400 of FIG. 7 or through the program operation of one or more software images of FIGS. 8A to 8D.

The fourth operation to the tenth operation of FIG. 9B, which are performed after the third operation, respectively correspond to the third operation to the ninth operation of FIG. 9A, and thus, additional description will be omitted to avoid redundancy.

FIG. 10 illustrates an algorithm address table (ALGADT) stored in advance in a system-on-chip (SoC) according to an embodiment of the disclosure.

The algorithm address table may include algorithm versions and pointers. The algorithm versions may be a plurality of versions for the new signature verification algorithm NDSA. The pointers may respectively include data on addresses of a memory, at which the versions of the new signature verification algorithm NDSA are respectively loaded.

For example, a first pointer p0 may include data on an address ADDR 0 of the memory, at which version 0 NDSA 0 of the new signature verification algorithm NDSA is loaded. The version 0 NDSA 0 of the new signature verification algorithm NDSA may be loaded at a location indicated by the first pointer p0.

For example, a second pointer p1 may include data on an address ADDR 1 of the memory, at which version 1 NDSA 1 of the new signature verification algorithm NDSA is loaded. The version 1 NDSA 1 of the new signature verification algorithm NDSA may be loaded at a location indicated by the second pointer p1.

For example, a third pointer p2 may include data on an address ADDR 2 of the memory, at which version 2 NDSA 2 of the new signature verification algorithm NDSA is loaded. The version 2 NDSA 2 of the new signature verification algorithm NDSA may be loaded at a location indicated by the third pointer p2.

However, in the algorithm address table, the number of algorithm versions and the number of pointers are not limited thereto.

Referring to FIGS. 9A and 10, information about the version 0 NDSA 0 of the new signature verification algorithm NDSA may be programmed in the OTP memory 430. In this case, the OTP program code OPC may include information about a location of the OTP memory 430, at the version 0 NDSA 0 is programmed. The location information of the OTP memory 430 will be described in detail with reference to FIG. 11.

The first core 441 may read the version 0 NDSA 0 based on the OTP program code OPC. The first core 441 may load the NDSA image corresponding to the version 0 NDSA 0 at the first address ADDR 0 of the volatile memory 420.

When the algorithm verification for the NDSA image of version 0 succeeds, the first core 441 may refer to the algorithm address table, may execute the internal secure code ISC, and may execute the new signature verification algorithm NDSA located at the first address ADDR 0.

Afterwards, information about the version 1 NDSA 1 of the new signature verification algorithm NDSA may be programmed in the OTP memory 430. In this case, the OTP program code OPC may include information about a location of the OTP memory 430, at the version 1 NDSA 1 is programmed.

The first core 441 may read the version 1 NDSA 1 based on the OTP program code OPC. The first core 441 may load the NDSA image corresponding to the read version 1 NDSA 1 at the second address ADDR 1 of the volatile memory 420.

When the algorithm verification for the NDSA image of version 1 succeeds, the first core 441 may refer to the algorithm address table, may execute the internal secure code ISC, and may execute the new signature verification algorithm NDSA located at the second address ADDR 1.

In this case, when the information about the version 1 NDSA 1 is programmed in the OTP memory 430, the first core 441 may verify an algorithm corresponding to version 1; when the verification succeeds, the first core 441 may execute the algorithm corresponding to version 1. That is, because the algorithm address table is permanently recorded at the nonvolatile memory 410 in the process of manufacturing the system-on-chip 400, the first core 441 may fail to execute the algorithm corresponding to a previous version (i.e., version 0).

Likewise, information about the version 2 NDSA 2 of the new signature verification algorithm NDSA may be programmed in the OTP memory 430. In this case, the OTP program code OPC may include information about a location of the OTP memory 430, at the version 2 NDSA 2 is programmed.

The first core 441 may read the version 2 NDSA 2 based on the OTP program code OPC. The first core 441 may load the NDSA image corresponding to the read version 2 NDSA 2 at the third address ADDR 2 of the volatile memory 420.

When the algorithm verification for the NDSA image of version 2 succeeds, the first core 441 may refer to the algorithm address table, may execute the internal secure code ISC, and may execute the new signature verification algorithm NDSA located at the third address ADDR 2.

In this case, when the information about the version 2 NDSA 2 is programmed in the OTP memory 430, the first core 441 may verify an algorithm corresponding to version 2; when the verification succeeds, the first core 441 may execute the algorithm corresponding to version 2. That is, the first core 441 may fail to execute algorithms corresponding to previous versions (i.e., version 0 and version 1).

Figure 11:
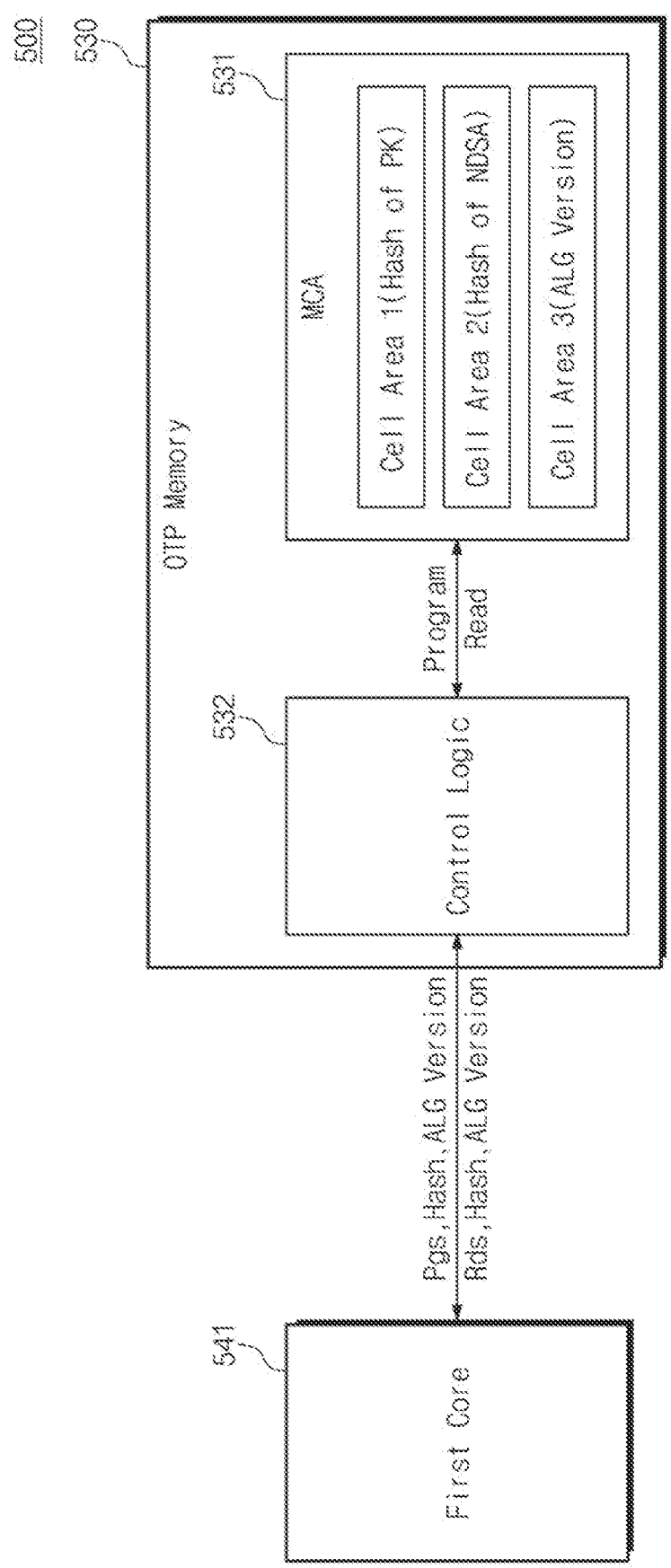
FIG. 11 is a diagram illustrating an OTP memory according to an embodiment of the disclosure in detail.

FIG. 11 is a diagram illustrating an OTP memory according to an embodiment of the disclosure in detail. For brevity of description, the remaining components other than a first core 541 and an OTP memory 530 are omitted in a system-on-chip (SoC) 500 of FIG. 11.

Referring to FIGS. 9A and 11, the first core 541 may execute an internal OTP program code OPC and may program the algorithm version and the hash values of the new signature verification algorithm NDSA in the OTP memory 530.

The hash values may include the hash value of the new signature verification algorithm NDSA itself and the hash value of the public key PK to be applied to the new signature verification algorithm NDSA.

The first core 541 may execute the internal secure code ISC to perform the bootloader verification and may execute the first secure code SC1 to perform the firmware verification. When the verifications succeed, the first core 541 may execute the OTP program code OPC.

The first core 541 may execute the internal secure code ISC or the first secure code SC1 and may transmit a read signal Rds to the OTP memory 530. The first core 541 may read the hash value of the public key PK programmed in the OTP memory 530 based on the read signal Rds.

The OTP program code OPC may include data of addresses of the OTP memory 530, at which the hash values of the new signature verification algorithm NDSA are to be stored, and data of an address of the OTP memory 530, at which the algorithm version of the new signature verification algorithm NDSA is to be stored.

The first core 541 may read the algorithm version and the hash values of the new signature verification algorithm NDSA based on the address data of the OTP program code OPC.

The first core 541 may execute the OTP program code OPC and may transmit a program signal Pgs to the OTP memory 530. The first core 541 may control the OTP memory 530 based on the program signal Pgs.

The OTP memory 530 may include a memory cell array 531 and control logic 532. The memory cell array 531 may include a plurality of memory cells. Each of the plurality of memory cells may store 1-bit data.

The memory cell array 531 may include a first cell area, a second cell area, and a third cell area. The hash value of the public key PK may be programmed in the first cell area. The hash value of the public key PK of the default signature verification algorithm DDSA may be programmed in the first cell area of the OTP memory 530 in the process of manufacturing a system-on-chip (SoC) 500.

When the signature verification for the software image succeeds, the hash value of the public key PK of the new signature verification algorithm NDSA may be programmed in the OTP memory 530.

The first core 541 may execute the OTP program code OPC and may control the OTP memory 530 such that the hash value of the default signature verification algorithm DDSA and the hash value of the public key PK of the new signature verification algorithm NDSA are programmed at different locations.

The hash value of the new signature verification algorithm NDSA may be programmed in the second cell area. In detail, the hash value associated with NDSA version 0 may be programmed at a first location of the second cell area based on the OTP program code OPC.

The hash value associated with NDSA version 1 may be programmed at a second location of the second cell area based on the OTP program code OPC. The hash value associated with NDSA version 2 may be programmed at a third location of the second cell area based on the OTP program code OPC.

The algorithm version of the new signature verification algorithm NDSA may be programmed in the third cell area. In detail, NDSA version 0 may be programmed at a first location of the third cell area based on the OTP program code OPC. The first location of the third cell area may correspond to the first location of the second cell area.

NDSA version 1 may be programmed at a second location of the third cell area based on the OTP program code OPC. The second location of the third cell area may correspond to the second location of the second cell area.

NDSA version 2 may be programmed at a third location of the third cell area based on the OTP program code OPC. The third location of the third cell area may correspond to the third location of the second cell area.

The memory cell array 531 may further include an area where there will be programmed address data of a volatile memory, which are stored in the algorithm address table of FIG. 10 and are used to load the versions of the new signature verification algorithm NDSA.

In this case, the address data ADDR 0, ADDR 1, and ADDR 2 may be programmed in the OTP memory 530 through the program operation of the system-on-chip 400 of FIG. 7 or through the program operation of one or more software images of FIGS. 8A to 8D. The address data ADDR 0, ADDR 1, and ADDR 2 may be stored in at least one software image described with reference to FIGS. 8A to 8D.

Accordingly, the system-on-chip 500 may execute the new signature verification algorithm NDSA corresponding to the read version information with reference to the algorithm address table or the address data of the volatile memory recorded at the OTP memory 530.

The control logic 532 may control the memory cell array 531 based on the program signal Pgs or the read signal Rds received from the first core 541.

The control logic 532 may control the OTP memory 530 based on the program signal Pgs such that the hash values of the new signature verification algorithm NDSA and the algorithm version of the new signature verification algorithm NDSA are programmed in the memory cell array 531.

The control logic 532 may control the OTP memory 530 based on the read signal Rds such that the hash value of the public key PK, the hash value of the new signature verification algorithm NDSA, and the algorithm version of the new signature verification algorithm NDSA are read from the memory cell array 531.

According to an embodiment of the disclosure, a system-on-chip and an operating method of the system-on-chip may perform a procedure for verifying a changed signature verification algorithm. When the verification succeeds, the system-on-chip and the operating method of the system-on-chip may execute the changed signature verification algorithm instead of a default algorithm. Accordingly, a system-on-chip that provides improved secure booting performance by safely and permanently changing the signature verification algorithm and an operating method of the system-on-chip may be provided.

While certain embodiments the disclosure have been particularly shown and described, it will be understood that various changes in form and details may be made therein without departing from the spirit and scope of the following claims.

What is claimed is:

1. A system-on-chip comprising:
a nonvolatile memory configured to load a first image received from external storage and a first signature verification algorithm;
at least one processor configured to control the nonvolatile memory such that first verifications are performed on the first image;
a volatile memory, wherein the first image is loaded to the volatile memory by the at least one processor; and
a one-time programmable (OTP) memory configured to program a hash value of a second signature verification algorithm different from the first signature verification algorithm,
wherein, in initialization, based on version information about the second signature verification algorithm being further programmed in the OTP memory, the at least one processor is further configured to:
load a second image received from the external storage to the volatile memory, the second image being different from the first image;
perform a second verification on the second image based on the programmed hash value;
based on the second verification succeeding, execute the second signature verification algorithm corresponding to the version information; and
perform the first verifications by applying the second signature verification algorithm to the first image.

2. The system-on-chip of claim 1, wherein, based on the version information not being programmed, the at least one processor is further configured to:
load the first image to the volatile memory; and
perform the first verifications by applying the first signature verification algorithm to the first image.

3. The system-on-chip of claim 2, wherein the first image comprises a bootloader code, a first secure code, a firmware code, a second secure code, a first signature, and a second signature,
wherein the first verifications comprise a bootloader verification and a firmware verification, and
wherein the at least one processor is further configured to:
perform the bootloader verification by applying the first signature verification algorithm to the first signature for the bootloader code and the first secure code; and
perform the firmware verification by applying the first signature verification algorithm to the second signature for the firmware code and the second secure code.

4. The system-on-chip of claim 3, wherein the first image further comprises the programmed hash value of the second signature verification algorithm and the version information, and
wherein the at least one processor is further configured to:
based on the bootloader verification and the firmware verification succeeding, program the programmed hash value and the version information in the OTP memory.

5. The system-on-chip of claim 3, wherein the bootloader verification is performed based on hash values calculated by applying a hash algorithm to each of the bootloader code and the first secure code.

6. The system-on-chip of claim 3, wherein the firmware verification is performed based on hash values calculated by applying a hash algorithm to each of the firmware code and the second secure code.

7. The system-on-chip of claim 1, wherein the second image comprises an algorithm code for a signature verification corresponding to the version information.

8. The system-on-chip of claim 7, wherein the at least one processor is further configured to:
calculate a hash value of the algorithm code; and
perform the second verification by comparing the hash value of the algorithm code and the programmed hash value.

9. The system-on-chip of claim 1, wherein the version information comprises a plurality of versions associated with the second signature verification algorithm, and
wherein the system-on-chip further comprises a plurality of pointers storing data on addresses of the volatile memory, at which the plurality of versions are respectively loaded.

10. The system-on-chip of claim 9, wherein, based on a first version among the plurality of versions being programmed, the at least one processor is further configured to:

load the second image including a first algorithm code for a first signature verification corresponding to the first version to the volatile memory;
perform the second verification based on a first hash value programmed with regard to the second image; and
based on the second verification succeeding, execute the first algorithm code indicated by a first pointer corresponding to the first version from among the plurality of pointers, and
wherein the first hash value is generated based on the first algorithm code corresponding to the first version.

11. The system-on-chip of claim 10, wherein, based on a second version among the plurality of versions being programmed after the first version is programmed, the at least one processor is further configured to:
load a second algorithm code for a second signature verification corresponding to the second version to the volatile memory such that the second verification is performed; and
based on the second verification succeeding, not execute the first algorithm code and execute the second algorithm code indicated by a second pointer corresponding to the second version from among the plurality of pointers.

12. The system-on-chip of claim 1, wherein the first image comprises a bootloader code, a first signature, a second signature, a first secure code, a firmware code, and a second secure code,
wherein the first verifications comprise a bootloader verification and a firmware verification, and
wherein the at least one processor is further configured to:
perform the bootloader verification by applying the second signature verification algorithm to the first signature for the bootloader code and the first secure code; and
perform the firmware verification by applying the second signature verification algorithm to the second signature for the firmware code and the second secure code.

13. The system-on-chip of claim 1, wherein the first signature verification algorithm comprises at least one of a Rivest Shamir Adleman (RSA) algorithm, an Elliptic Curve Digital Signature Algorithm (ECDSA), and an Edwards-curve Digital Signature Algorithm (EdDSA), and
wherein the second signature verification algorithm comprises a Post-Quantum Cryptography (PQC) algorithm.

14. An operating method of a system-on-chip which comprises a nonvolatile memory storing a first signature verification algorithm, a volatile memory, and a one-time programmable (OTP) memory, and at least one processor configured to control the nonvolatile memory, the volatile memory, and the OTP memory, the operating method comprising:
reading, by the at least one processor, the OTP memory;
based on version information about a second signature verification algorithm different from the first signature verification algorithm being programmed in the OTP memory, loading, by the at least one processor, a first image received from external storage to the volatile memory;
performing, by the at least one processor, a first verification on the first image based on a programmed hash value of the second signature verification algorithm programmed in the OTP memory;
based on the first verification succeeding, executing, by the at least one processor, the second signature verification algorithm corresponding to the version information;
loading, by the at least one processor, a second image received from the external storage to the volatile memory, the second image being different from the first image; and
performing, at by the at least one processor, second verifications by applying the second signature verification algorithm to the second image.

15. The operating method of claim 14, further comprising:
based on the programmed hash value and the version information not being programmed in the OTP memory, performing, by the at least one processor, the second verifications by applying the first signature verification algorithm to the second image.

16. The operating method of claim 15, wherein the second image comprises a bootloader code, a first secure code, a firmware code, a second secure code, a first signature, and a second signature,
wherein the second verifications comprise a bootloader verification and a firmware verification, and
wherein the performing the second verifications comprises:
performing, by the at least one processor, the bootloader verification by applying the first signature verification algorithm or the second signature verification algorithm to the first signature for the bootloader code and the first secure code values; and
performing, by the at least one processor, the firmware verification by applying the first signature verification algorithm or the second signature verification algorithm to the second signature for the firmware code and the second secure code.

17. The operating method of claim 15, wherein the second image further comprises the programmed hash value of the second signature verification algorithm and the version information, and
wherein the operating method further comprises:
based on the second verifications using the first signature verification algorithm succeeding, programming, by the at least one processor, the programmed hash value and the version information in the OTP memory.

18. The operating method of claim 14, wherein the first image comprises an algorithm code for a signature verification corresponding to the version information, and
wherein the performing the first verification comprises:
calculating, at the at least one processor, a hash value of the algorithm code; and
comparing the hash value and the programmed hash value.

19. The operating method of claim 14, wherein the first signature verification algorithm comprises at least one of a Rivest Shamir Adleman (RSA) algorithm, an Elliptic Curve Digital Signature Algorithm (ECDSA), and an Edwards-curve Digital Signature Algorithm (EdDSA), and
wherein the second signature verification algorithm comprises a Post-Quantum Cryptography (PQC) algorithm.

20. An operating method of a system-on-chip which comprises a nonvolatile memory storing a first signature verification algorithm, a volatile memory, and a one-time programmable (OTP) memory, and at least one processor configured to control the nonvolatile memory, the volatile memory, and the OTP memory, the operating method comprising:
reading, by the at least one processor, the OTP memory;

based on version information about a second signature verification algorithm different from the first signature verification algorithm being programmed in the OTP memory, loading, by the at least one processor, an encrypted first image received from external storage to the volatile memory;

decrypting, by the at least one processor, the encrypted first image to obtain a decrypted first image;

performing, by the at least one processor, a first verification on the decrypted first image based on a programmed hash value of the second signature verification algorithm programmed in the OTP memory;

based on the first verification succeeding, executing, by the at least one processor, the second signature verification algorithm corresponding to the version information;

loading, by the at least one processor, a second image received from the external storage to the volatile memory, the second image being different from the encrypted first image; and performing, by the at least one processor, second verifications by applying the second signature verification algorithm to the second image.

* * * * *